US008650101B1

(12) United States Patent
Glustrom et al.

(10) Patent No.: US 8,650,101 B1
(45) Date of Patent: Feb. 11, 2014

(54) INTERNAL MATERIAL SYSTEM FOR FACILITATING MATERIAL AND ASSET MOVEMENT WITHIN ORGANIZATIONAL INFRASTRUCTURES

(75) Inventors: Robert Glustrom, Atlanta, GA (US); Richard Schafer, Sachse, TX (US)

(73) Assignee: TSN LLC, Atlanta, GA (US)

( * ) Notice: Subject to any disclaimer, the term of this patent is extended or adjusted under 35 U.S.C. 154(b) by 0 days.

(21) Appl. No.: 13/252,086

(22) Filed: Oct. 3, 2011

(51) Int. Cl.
*A01K 5/02* (2006.01)
*G06F 17/50* (2006.01)

(52) U.S. Cl.
USPC ........................................... 705/29; 705/7.12

(58) Field of Classification Search
None
See application file for complete search history.

(56) References Cited

U.S. PATENT DOCUMENTS

| | | | |
|---|---|---|---|
| 5,388,259 A | 2/1995 | Fleischman et al. | |
| 5,424,944 A | 6/1995 | Kelly et al. | |
| 5,680,325 A | 10/1997 | Rohner | |
| 5,761,432 A | 6/1998 | Bergholm et al. | |
| 6,728,352 B1 | 4/2004 | Phillips et al. | |
| 7,127,458 B1 | 10/2006 | Mantripragada et al. | |
| 7,286,889 B1 * | 10/2007 | Orzell et al. | 700/101 |
| 7,315,887 B1 | 1/2008 | Liang et al. | |
| 7,606,743 B2 * | 10/2009 | Orzell et al. | 705/28 |
| 7,610,212 B2 * | 10/2009 | Klett et al. | 705/7.12 |
| 7,779,069 B2 | 8/2010 | Frid-Nielsen et al. | |
| 7,801,770 B2 | 9/2010 | Nelson | |
| 7,860,221 B2 | 12/2010 | Adkinson et al. | |
| 2002/0072988 A1 | 6/2002 | Aram | |
| 2003/0014332 A1 | 1/2003 | Gramling | |
| 2003/0055749 A1 | 3/2003 | Carmody et al. | |
| 2003/0234288 A1 | 12/2003 | Canipe et al. | |
| 2004/0024628 A1 | 2/2004 | Eck et al. | |
| 2004/0093287 A1 | 5/2004 | Gupta et al. | |
| 2004/0098321 A1 | 5/2004 | Liu | |
| 2004/0153372 A1 | 8/2004 | Pilzer | |
| 2005/0171827 A1 | 8/2005 | Denton et al. | |
| 2005/0246249 A1 | 11/2005 | Bardwell | |
| 2006/0059262 A1 | 3/2006 | Adkinson et al. | |
| 2006/0152370 A1 | 7/2006 | Vishik et al. | |
| 2007/0058597 A1 | 3/2007 | Frid-Nielsen et al. | |
| 2007/0118643 A1 | 5/2007 | Mishra et al. | |
| 2007/0162171 A1 | 7/2007 | McDonald et al. | |
| 2009/0138371 A1 | 5/2009 | McGee | |

(Continued)

FOREIGN PATENT DOCUMENTS

| | | |
|---|---|---|
| CA | 2451947 A1 | 6/2005 |
| EP | 0425406 A2 | 5/1991 |

(Continued)

*Primary Examiner* — Luna Champagne
(74) *Attorney, Agent, or Firm* — Marsh Fischmann & Breyfogle LLP; Jonathan A. Szumny

(57) ABSTRACT

Utilities that allow organizations to implement "best practices" life-cycle management, asset disposition and asset tracking with enhanced visibility and accountability. In one aspect, a utility for use with managing inventory within the infrastructure of a technology service provider includes receiving a first bill of materials (BOM) from a first physical location, accessing an asset inventory listing for the technology service provider, first allocating assets in the asset inventory listing associated with the first physical location to the quantity of the first requested part of the first line item, and second allocating assets in the asset inventory listing associated with one or more additional physical locations within the first market to the quantity of the first requested part responsive to the first using failing to result in fulfillment of the quantity of the first requested part of the first line item.

9 Claims, 23 Drawing Sheets

(56) References Cited

U.S. PATENT DOCUMENTS

| | | |
|---|---|---|
| 2009/0224891 A1 | 9/2009 | Vishik et al. |
| 2009/0282432 A1 | 11/2009 | Hahnefeld et al. |
| 2010/0022221 A1 | 1/2010 | Yi et al. |
| 2010/0191562 A1 | 7/2010 | McFarland, Jr. et al. |
| 2010/0219941 A1 | 9/2010 | Pagano et al. |
| 2010/0250268 A1 | 9/2010 | Rappaport |
| 2010/0274686 A1 | 10/2010 | Graefe et al. |
| 2010/0275110 A1 | 10/2010 | Frid-Nielsen et al. |
| 2011/0137708 A1 | 6/2011 | Venkatasubramanyan et al. |
| 2011/0145056 A1 | 6/2011 | Sullivan et al. |

FOREIGN PATENT DOCUMENTS

| | | |
|---|---|---|
| GB | 2432992 A | 6/2007 |
| WO | WO0156654 A1 | 8/2001 |
| WO | WO0177936 A2 | 10/2001 |
| WO | WO03025704 A2 | 3/2003 |
| WO | WO2011088108 A2 | 7/2011 |

\* cited by examiner

HOME > INTERNAL MATERIAL SYSTEM > PENDING POSTINGS > MY VIEW
PENDING POSTINGS: MY VIEW

MATERIAL AVAILABILITY | PENDING POSTINGS | ADT POSTINGS
VIEW: ▷ MY VIEW

FILTER BY: RMP-PENDING APPROVAL ▼

SEARCH OPTIONS: PROCESS ID ▼ [FIND]
DATA RANGE

VIEW [25 ▼] [< 1 2 3 4 5 >>]

| ☐ | PROCESS ID | UPLOADED | UPLOADED BY | STATUS | S. TOTAL QTY | ACTION |
|---|---|---|---|---|---|---|
| ☐ | P001269 | 9/12/2011 3:07:45 AM | USERA SOLUTIONS2 | PENDING | 15 | RMP ACTION |
| ☐ | P001264 | 9/6/2011 8:44:56 AM | USERB SOLUTIONS2 | PENDING | 10 | RMP ACTION |
| ☐ | P001265 | 8/12/2011 3:20:42 AM | USERA SOLUTIONS2 | PENDING | 1 | RMP ACTION |
| ☐ | P001264 | 8/12/2011 1:17:27 AM | USERA SOLUTIONS2 | PENDING | 6 | RMP ACTION |
| ☐ | P001263 | 8/12/2011 1:16:45 AM | USERA SOLUTIONS2 | PENDING | 1 | RMP ACTION |
| ☐ | P001262 | 8/12/2011 1:13:47 AM | USERB SOLUTIONS2 | PENDING | 54 | RMP ACTION |
| ☐ | P001261 | 8/12/2011 1:11:25 AM | USERA SOLUTIONS2 | PENDING | 150 | RMP ACTION |
| ☐ | P001260 | 8/12/2011 1:09:43 AM | USERA SOLUTIONS2 | PENDING | 100 | RMP ACTION |
| ☐ | P001259 | 8/12/2011 1:09:04 AM | USERA SOLUTIONS2 | PENDING | 6 | RMP ACTION |
| ☐ | P001258 | 8/12/2011 1:06:46 AM | USERA SOLUTIONS2 | PENDING | 4 | RMP ACTION |
| ☐ | P001257 | 8/12/2011 1:06:13 AM | USERMM SOLUTIONS2 | PENDING | 10 | RMP ACTION |
| ☐ | P001233 | 7/19/2011 2:56:51 AM | USERA SOLUTIONS2 | PENDING | 100 | RMP ACTION |
| ☐ | P001232 | 7/19/2011 2:54:10 AM | USERA SOLUTIONS2 | PENDING | 1 | RMP ACTION |
| ☐ | P001231 | 7/18/2011 12:57:32 AM | USERA SOLUTIONS2 | PENDING | 3 | RMP ACTION |
| ☐ | P001223 | 7/13/2011 1:13:04 AM | USERA SOLUTIONS2 | PENDING | 100 | RMP ACTION |
| ☐ | P001222 | 7/13/2011 1:06:52 AM | USERMM SOLUTIONS2 | PENDING | | RMP ACTION |

INTERNAL MATERIAL SYSTEM FOR FACILITATING MATERIAL AND ASSET MOVEMENT WITHIN ORGANIZATIONAL INFRASTRUCTURES

BACKGROUND

1. Field of the Invention

The present invention generally relates to asset management and, more particularly to systems, methods and other utilities that facilitate the movement of assets within an organization's infrastructure for use in providing life-cycle management, asset disposition and asset tracking with enhanced accountability.

2. Relevant Background

Many companies in a wide variety of industries monitor the use and disposition of assets of the companies for numerous in-house or internal purposes. That is, as opposed to the management of inventory or supply that is to be utilized to build a number of products for sale to end-users, companies are often concerned with the tracking of assets to be used within an infrastructure of the companies. For instance, in the case of technology service providers (e.g., mobile communications providers, wire-line communication providers, installation and engineering providers, etc.), there is often emphasis on monitoring the use of warehouse and spares inventory that include parts and equipment such as antennas, switches, routers, multiplexors, cross connect panels, plug-ins, and the like.

SUMMARY

Existing products available to organizations for asset management leave much room for improvement in relation to more effectively managing such assets to the benefit of organizations. In this regard, disclosed herein are a number of systems, methods and the like (i.e., "utilities") that allow technology service providers to implement "best practices" life-cycle management, asset disposition and asset tracking with enhanced visibility and accountability. The disclosed utilities may allow users to realize increased returns on investment (ROI), extension of product lifecycles, and reduction of equipment costs and write-downs by way of improvement of spares management and forecasting and enhanced inventory control (e.g., through movement of assets to where they are needed within the organization's infrastructure, real-time tracking and visibility of asset movement, and the like).

In one aspect, a utility for use with managing inventory within the infrastructure of a technology service provider is provided. The utility includes receiving, at a processing engine (e.g., a processor of a server), at least a first bill of materials (BOM) that includes at least a first line item. The first line item represents a quantity of at least a first part requested for at least one project that is associated with a first physical location within a first market of the infrastructure. The utility also includes accessing in a database, using the processing engine, an asset inventory listing for the technology service provider; first using the processing engine to allocate, in the database, any assets in the asset inventory listing associated with the first physical location to the quantity of the first requested part of the first line item; and second using the processing engine to allocate, in the database, any assets in the asset inventory listing associated with one or more additional physical locations within the first market to the quantity of the first requested part responsive to the first using failing to result in fulfillment of the quantity of the first requested part of the first line item.

That is, the utility first considers "on-hand" inventory available at or near the originating point of the BOM request (i.e., within a warehouse at first physical location at or near the project for which the BOM is requested) for fulfilling requested part quantities. Therefore, in the case that the requested part quantity cannot be fulfilled by the on-hand inventory, the utility then considers inventory at other physical locations within a market of the first physical location (e.g., materials that have been flagged as being available for consumption by BOMs associated with other physical locations). In the event that on-hand inventory and other inventory within the first market fail to fulfill the requested part quantity, some variations of the utility contemplate allocating assets associated with physical locations of a second market (where the first and second markets are disposed within a first region of the providers infrastructure) to the requested part quantity and/or allocating assets associated with a second region of the infrastructure to the requested part quantity.

In this regard, this utility allows for BOMs to be fulfilled substantially automatically by way of one or more expanding concentric searches of a provider's complete inventory; doing so serves to limit the long, time-consuming searches of various databases performed by existing searching products and the accompanying errors. More specifically, the disclosed concentric searching may be with respect to each technology service provider's infrastructure, where the infrastructure is hierarchically organized into locations, markets, regions, and the like (e.g., where each market includes one or more locations, each region includes one or more markets, and the like). Furthermore, as provider infrastructures may be appropriately organized to satisfy various accounting and budgeting constraints, the hierarchically organized infrastructure need not necessarily be geographically organized For instance, while a location that is only an hour's drive from the originating location may be able to supply a requested part quantity immediately, the location may be in a different region than the originating location and result in additional accounting and approval processes that may essentially nullify any benefit owing to the close location of the part(s). As another example, a different location that is two hours away within the same region as the originating location could also be shipped immediately but without the hassle of accounting or approvals (due to being in the same region as the originating location). Thus, the utility allows provider managers and other administrators to customize the provider's infrastructure in any desired manner for use in the efficient movement of assets between infrastructure locations.

In another aspect, a utility is disclosed for use with managing inventory within the infrastructure of a technology service provider that includes providing a database including a prioritized listing of bills of material (BOMs), where each BOM includes a plurality of line items, and where each line item represents a quantity of a part requested for at least one project within the infrastructure. The utility also includes determining, using a processing engine, an estimated issue date (EID) for asset quantities of the infrastructure (e.g., asset quantities that are considered to be "excess" within the infrastructure) that match each line item of each BOM, where the EID represents the soonest that the infrastructure asset quantities can fulfill the quantity of parts of the line item; and assigning infrastructure asset quantities having sooner EIDs to line items of BOMs in the prioritized listing of BOMs that have higher priorities than other BOMs. In this regard, the utility can advantageously assign infrastructure assets with the soonest EIDs to the highest priority BOMs.

In one arrangement, the utility may include positioning one BOM above another BOM in the prioritized listing of BOMs (e.g., reprioritizing the BOMs); and then assigning, in response to the positioning, infrastructure asset quantities of a common part to line items of BOMs in the prioritized listing of BOMs that have higher priorities than other BOMs (e.g., "reshuffling" infrastructure asset quantities). After the assigning, an infrastructure asset quantity allocated to a common part line item of the one BOM has a sooner EID than does an infrastructure asset quantity allocated to a common part line item of the other BOM (where the EIDs of the infrastructure asset quantities may have been vice versa before the BOM reprioritization). These steps advantageously allow higher priority BOMs to essentially utilize infrastructure assets that have already been ordered for other BOMs (i.e., robbing Peter to pay Paul) which may result in faster BOM line item fulfillment (e.g., as compared to having to newly order assets or parts for a BOM line item). In another arrangement, one or more infrastructure asset quantities can be locked or bound to a particular BOM line item which prevents the locked quantity from being "reshuffled".

In another aspect, a method for use with managing inventory within the infrastructure of a technology service provider includes providing a database including an asset inventory listing for the technology service provider, the asset inventory listing comprising a plurality of line items respectively representing a plurality of parts available for consumption by a respective plurality of physical locations within the infrastructure; receiving, at a processing engine, a request to post a first quantity of parts of a first line item of a physical location of the asset inventory listing into a material available (MA) status, where the MA status indicates that the first quantity of parts is to be available for consumption by projects associated with other physical locations in the infrastructure; assigning, using the processing engine, a second quantity of parts of the first line item into MA status in the database; and sending, from the processing engine in response to expiration of a first predetermined period of time, a message requiring election of continued MA status of the second quantity of parts or a return to a non-MA status.

In one arrangement, the utility may include receiving, in response to the sending, an election to continue MA status of the second quantity of parts; continuing MA status of the second quantity of parts; and ending, from the processing engine in response to expiration of the first predetermined period of time, a message requiring election of continued MA status of the second quantity of parts or a return to a non-MA status. In another arrangement, the utility may include assigning the second quantity of parts into a non-MA status upon expiration of a second predetermined period of time in which the election has yet to be received at the processing engine.

In another aspect, a method for use with managing inventory within the infrastructure of a technology service provider includes receiving, at a processing engine, asset data corresponding to movement of assets from a first physical location to a second physical location within the infrastructure. The asset data includes shipped asset data corresponding to assets reported to have been shipped from the first physical location to the second physical location, received asset data corresponding to assets reported to have been received at the second physical location from the first physical location, and status data comprising a first status of the assets within the infrastructure. The utility also includes determining, using the processing engine, whether any discrepancies exist between the shipped and received asset data (e.g., in quantities, part numbers, etc.); and, responsive to at least one discrepancy existing during the determining, disallowing modification of the status data from the first status to at least one second status until the at least one discrepancy is reconciled. This aspect advantageously forces action on the part of an RMP or other user to rectify the discrepancy as a failure to do so would prevent the assets from being able to fulfill BOM line items, be sold by dealers, etc. and, in other words, would cause a chokepoint in the free and efficient flow of infrastructure assets.

In one variation, the utility may include receiving, at the processing engine, updated shipped and received asset data; determining, using the processing engine, whether any discrepancies exist between the shipped and received asset data, the shipped and received asset data including the updated shipped and received asset data; and responsive to the determining failing to detect the existence of any discrepancies between the shipped and received asset data, allowing modification of the status data from the first status to the at least one second status.

In another aspect, a method for use with managing inventory within the infrastructure of a technology service provider includes first receiving, at a processing engine as part of at least a first process, first asset data identifying at least one part to be used within the infrastructure, wherein the first asset data comprises at least one part identifier and at least one manufacturer identifier; accessing a database that includes a plurality of part and manufacturer identifiers corresponding to parts used within the infrastructure; locating the part and manufacturer identifiers of the first asset data in the database; determining, using the processing engine, that at least one of the part and manufacturer identifiers is an alias part or manufacturer identifier of a first master part identifier or a first manufacturer identifier in the database; and replacing, in the first process, the at least one alias part or manufacturer identifier with the first master part identifier or first master manufacturer identifier.

In one variation, the utility may include second receiving, at the processing engine as part of at least a second process, second asset data identifying at least one part to be used within the infrastructure, wherein the second asset data comprises at least one part identifier and at least one manufacturer identifier; accessing the database; locating the part and manufacturer identifiers of the second asset data in the database; determining, using the processing engine, that at least one of the part and manufacturer identifiers is an alias part or manufacturer identifier of the first master part identifier or first master manufacturer identifier in the database; and replacing, in the second process, the at least one alias part or manufacturer identifier with the first master part identifier or first master manufacturer identifier, wherein the first and second processes correspond to use of the same exact part within the infrastructure.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIGS. 2-15 illustrate various screenshots of a portal of the server of FIG. 1 accessible by technology service provider users for use in efficiently managing their internal assets.

FIGS. 18-19 illustrate various screenshots of the portal of FIG. 1.

FIGS. 21-22 illustrate various screenshots of the portal of FIG. 1.

DETAILED DESCRIPTION

The present disclosure generally relates to utilities designed to allow organizations to more efficiently manage and monitor movement of their internal assets (i.e., as opposed to inventory and supplies intended to form part of products for end-users) within the infrastructures of the organizations for use in fulfilling BOM requests, improving spares and warehouse inventory usage, extending product lifecycles, and the like. In much of the following discussion, various utilities are discussed in the context of service providers (i.e., entities that provide services such as subscription or web services to other entities) such as communications service providers (e.g., telecommunications services providers) as doing so is particularly useful due to the extent of the infrastructure of such providers involving the movement of numerous types of assets (e.g., parts necessary to build cellular towers, switching stations, etc.) between locations of the infrastructure. It should be appreciated that the disclosed utilities may, in some arrangements, be utilized in contexts other than service providers.

Figure 1:
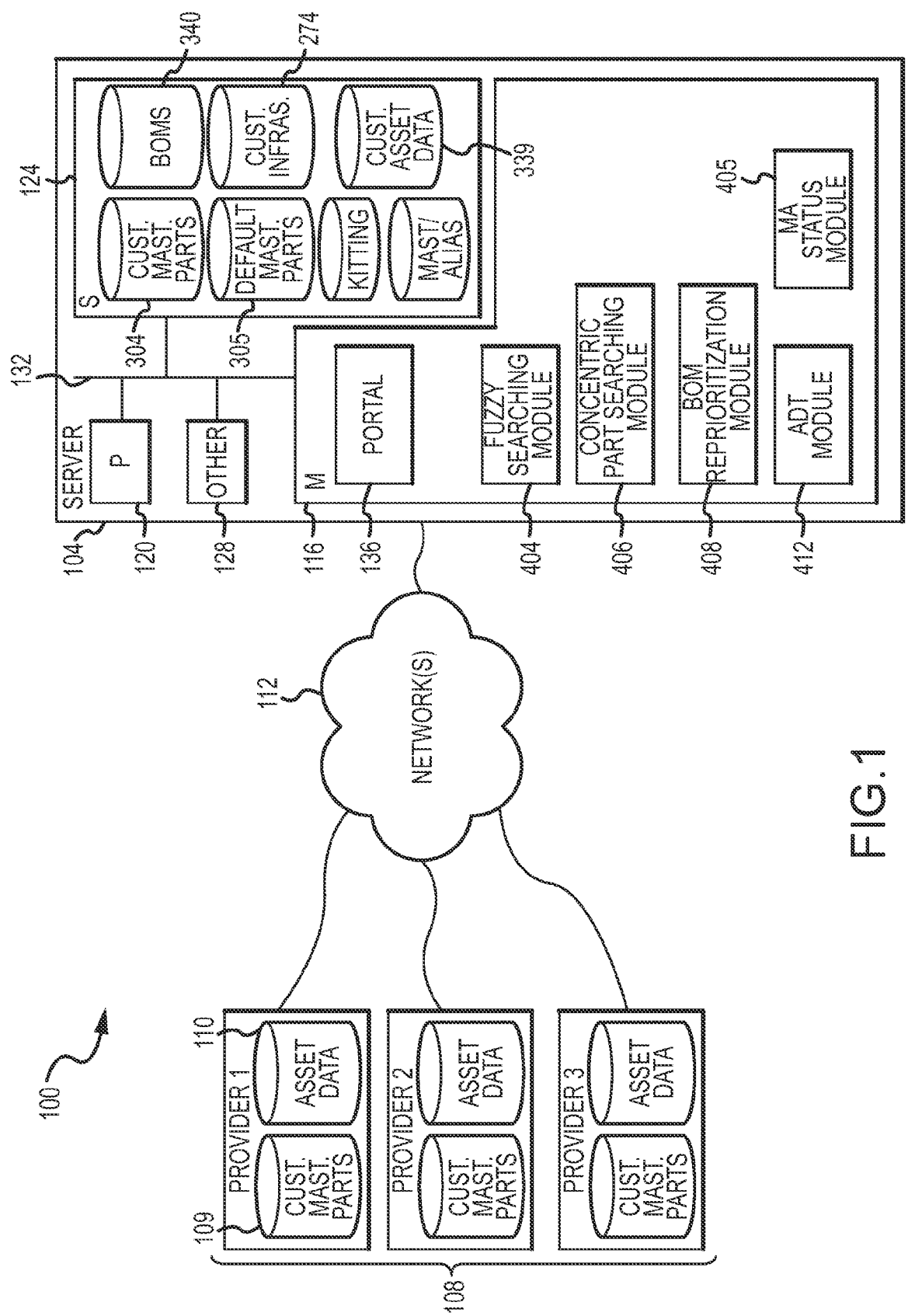
FIG. 1 is a schematic system diagram illustrating the relationship between a number of technology service providers and the functionality of an asset management server according to one embodiment.

Turning now to FIG. 1, a functional block diagram of a system 100 is illustrated that may be used to efficiently manage and track the use and movement of organizational (e.g., technology service provider) assets to where such assets are needed within the provider infrastructures. The system 100 includes at least one server 104 that broadly receives customer (e.g., provider) data (e.g., master parts lists, asset data, infrastructure information, etc.) and subsequently processes such data using one or more modules (either individually or in combination) in a manner that allows customers to effectively manage their internal assets. The server 104 may be in communication with one or more organizations such as one or more service providers 108 (each including an infrastructure of locations, markets, etc. as will be discussed below) by way of one or more networks 112 (e.g., Internet, WANs, LANs). While the server 104 is shown as a single device (e.g., server, laptop, desktop, mobile device, and/or other computing device), one or more functionalities, processes or modules of the server 104 may be allocated among a plurality of machines, devices and/or processes which may or may not be embodied in a single housing. In one arrangement, functionalities of the server 104 may be embodied in any appropriate cloud or distributed computing environment.

The server 104 may include memory 116 (e.g., one or more RAM or other volatile memory modules), a processing engine or unit 120 (e.g., one or more CPUs) for executing computer readable instructions from the memory 116, storage 124 (e.g., one or more magnetic disks or other non-volatile memory modules), and/or a number of other components 128 (e.g., input devices such as a keyboard and mouse, output devices such as a display and speakers, and the like), all of which may be appropriately interconnected by a system bus 132. While not shown, the server 104 may include any appropriate number and arrangement of interfaces that may facilitate interconnection between the system bus 132 and the various components of the server 104 as well as with other devices (e.g., providers 108).

As shown, the memory 116 may include a portal 136 (e.g., an Internet or web-based platform) in addition to a number of programs or modules (for execution by the processing unit 120) that may be accessed by the portal 136 for use in efficiently managing and controlling warehouse and spares inventories of the providers 108. For instance, any appropriate browser (not shown) running on client devices (e.g., including memory, processor, storage, display, etc.) of the providers 108 may appropriately access the portal 136 via network(s) 112 (which may entail entering or providing any appropriate credentials such as user name and password). While reference will now be made to a number of representative screenshots of the portal 136 that may be presented on a display of a client device of a provider 108 and that may be manipulated by each provider users (e.g., by administrators, managers, and/or other users) to manage and monitor their internal inventories, it should be understood that the various functionalities disclosed herein are not limited to use with such specific screenshots. Rather, the screenshots are merely provided to facilitate the reader's understanding of the various programs, modules and other functionalities disclosed herein.

Figure 2:
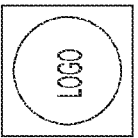

Starting now at FIG. 2, various screenshots of the portal 136 will be illustrated that broadly provide users with the ability to track asset status in real-time, facilitate movement of assets between to where they are needed within the provider infrastructures, and the like. Like many of the other screenshots that will be discussed below, the screenshot 200 in FIG. 2 includes a number of "first-level" buttons 204 (or other types of user-manipulable features), a number of "second level" buttons 208 (or other types of user-manipulable features), and/or a number of "third level" buttons 212 (or other types of user manipulable features) for use in accessing the various functionalities herein. In one arrangement, the first level buttons 204 may remain the same throughout the various screenshots while the second and/or third level buttons 208, 212 may change (to provide access to different functionalities) depending upon which of the first level buttons 204 (or second level buttons 208) have been manipulated. It should be understood, however, that the present disclosure is not limited to the specific arrangements and names of buttons, drop-down menus, and the like shown in the present figures. Rather, these features have only been provided to assist the reader in understanding the various functionalities disclosed herein.

In this screenshot 200, a "company settings" button 204 and "company info" button 208 have been manipulated which broadly allow a service provider to set and/or upload specific provider information to be used by the various functionalities disclosed herein (e.g., and which may be appropriately stored in storage 124). More specifically, FIG. 2 illustrates a number of cells 216 (and/or other features) that may be presented upon manipulation of a "main company information" button 212 and that may be populated with basic provider contact information (e.g., name, address, phone number, website address, etc.).

Figure 3:
Figure 4:
Figure 5:
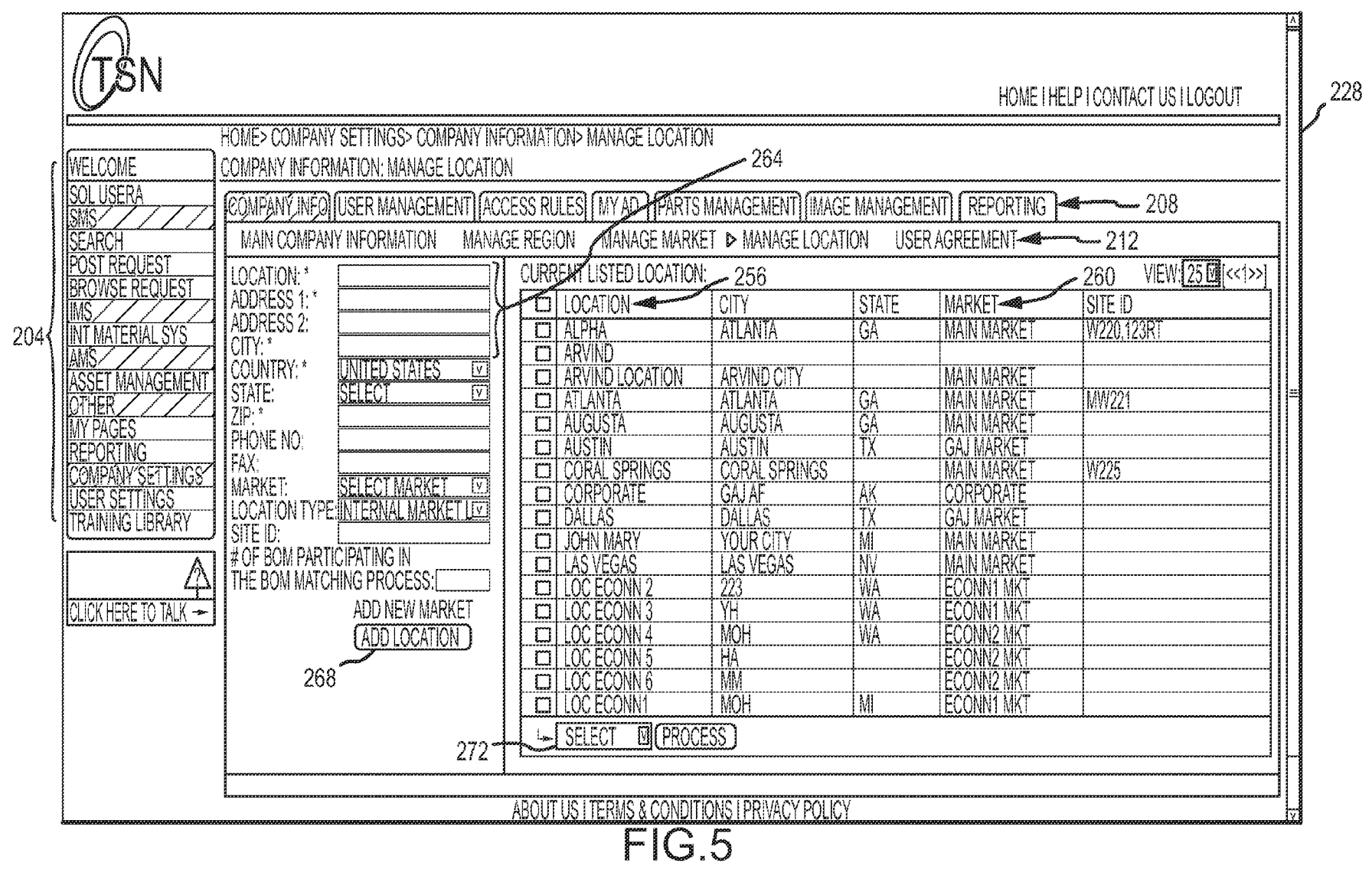

FIGS. 3-5 illustrate screenshots 220, 224, 228 that may be presented upon respective manipulation of "manage region," "manage market," and "manage location" buttons 212. Each provider 108 may utilize these buttons 212 to establish any desired infrastructure within which provider assets are to be managed. As shown in FIG. 3, the screenshot 220 may include a column 232 listing a number of regions (e.g., "Main Region," "Corporate," etc.) of a provider, a button 236 that allows for the addition of additional regions, a drop-down menu 238 that allows for editing and other processing of one or more of the regions, and/or a number of other user manipulable features. As shown in FIG. 4, the screenshot 224 may include a column 240 listing a number of markets (e.g., "Corporate," "Main Market," etc.), a column 244 listing the region (as provided in FIG. 3) within which each market resides, a button 248 that allows for the addition of additional markets, a drop-down menu 252 that allows for editing and other processing of one or more of the regions, and/or a number of additional user manipulable features.

As shown in FIG. 5, the screenshot 228 may include a column 256 listing a number of physical locations (e.g., cities, warehouses, etc., such as "Atlanta," "Alpha," etc.), a column 260 listing the market within which each of the locations resides, a section 264 within which contact and identification data of one or more of the locations can be manipulated, a button 268 that allows for the addition of additional locations, a drop-down menu 272 that allows for the editing and other processing of one or more of the locations, and/or a number of additional user manipulable features. In this regard, each provider may be able to establish any desired hierarchical infrastructure (e.g., where each region includes one or more markets, and where each market includes one or more locations) that may be stored in a customer infrastructure database 274 and used by the functionalities disclosed herein to efficiently move assets between provider locations. Further discussion in relation to hierarchically organized infrastructures will be provided below.

Figure 6:
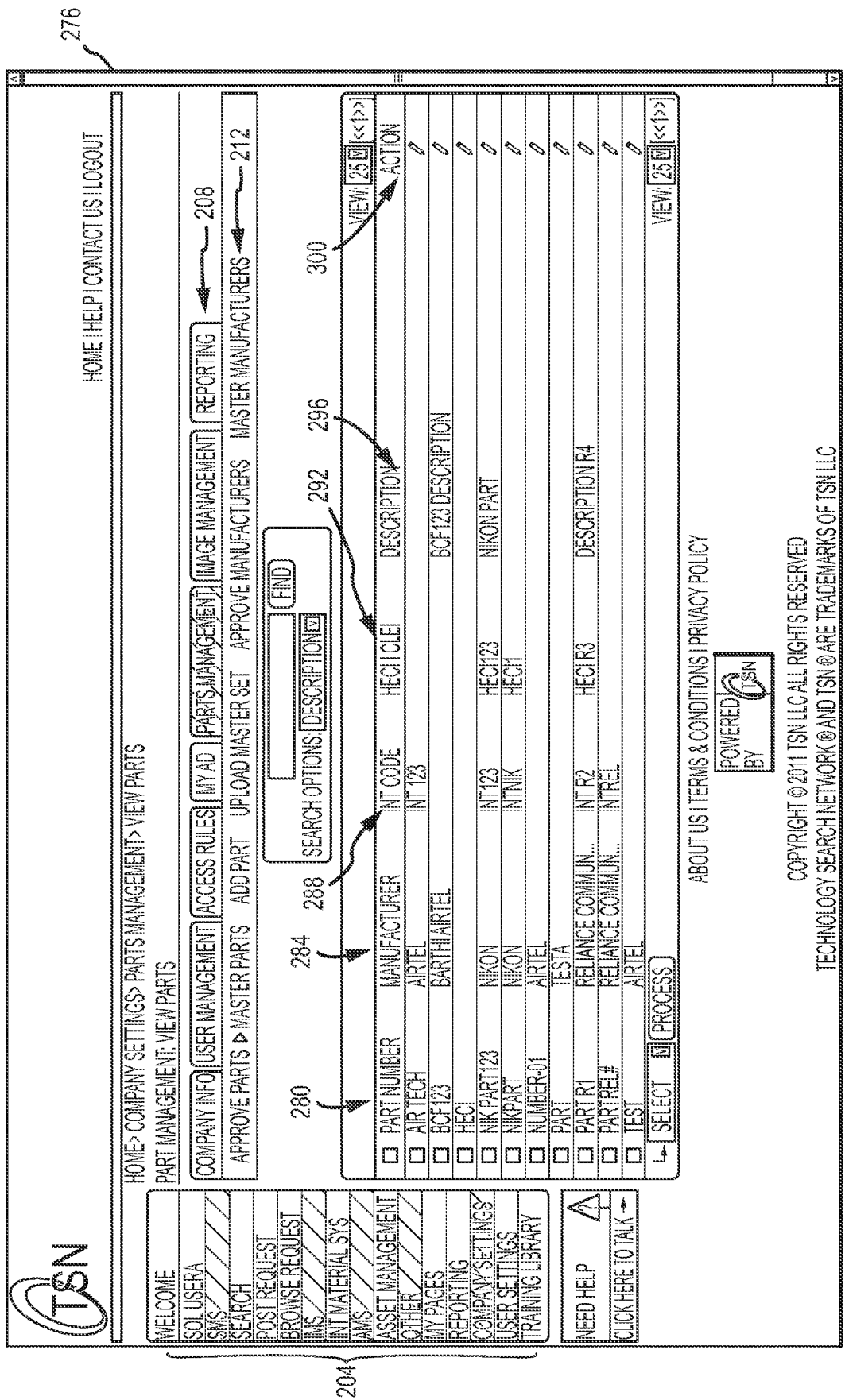

Turning to FIG. 6, another screenshot 276 may be presented on a user's display upon manipulation of a "parts management" button 208 and a "master parts" button 212. This screenshot 276 illustrates information related to each of a number of physical parts (i.e., assets) used in the infrastructure of a particular service provider. Before discussing the screenshot 276 in more detail, it is noted that the memory 116 of the server 104 may include a "fuzzy" searching module 404 (e.g., one or more sets of computer-readable instructions) that works in conjunction with other modules and functionalities disclosed herein to allow for "intelligent" searching capabilities. As will be appreciated throughout this discussion, provision and storage of various pieces of identifying data for each part (e.g., master part number, manufacturer name, internal code, etc.) advantageously allows the fuzzy searching module 404 to perform fuzzy searching and/or cross-referencing of the pieces of data as part of many of the other processes disclosed herein (e.g., during initial loading of part numbers and manufacturer names, when infrastructure locations are updating asset quantities, loading BOMs, etc.) to increase the ability of the server 104 to accurately identify part matches (e.g., such as reducing the likelihood that two identical parts are surmised to be different due to differing internal codes used at different locations within a service provider's infrastructure).

For instance, the screenshot 276 may include a "part number" column 280 that lists a master part number or name for each respective part, a "manufacturer" column 284 that indicates a manufacturer or supplier for each respective part, an "internal code" column 288 that indicates a possibly unique internal code or number for each part, a "HECl/CLEI" column 292 that indicates a code or number used by the manufacturer to identify the part, a "description" column 296 that allows a user to enter any appropriate description for each part, and an "action" column 300 that allows a user to take one or more actions with respect to each part. The various pieces of data illustrated in the screenshot 276 may be stored in a customer master parts database 304 corresponding to each particular service provider.

Figure 7:

To modify the data in any of the various columns 280-296 for a particular part, an icon (or button or other user manipulable feature) in the action column 300 for the part may be manipulated to cause the display of a pop-up window 308. Turning now to FIG. 7, another screenshot 306 may be presented which includes the pop-up window 308. For instance, the pop-up window 308 may include a number of cells, drop-down menus and the like that allow a user to modify or otherwise set any of the data in the columns 280-296 as well as other types of identifying information or metrics for the particular part (e.g., dimensions, weight, etc.). As shown, one cell 312 (or other feature) of the pop-up window 308 allows a user to enter one or more alternate part numbers for the particular part being edited (that, along with the other pieces of identifying information and metrics, is linked to and cross-referenced with the part number and each of the other pieces of information and metrics in the database 304). Provision of an alternate part number allows, for instance, the fuzzy searching module 404 to facilitate fulfillment of a particular BOM line item quantity even if the originally requested part (i.e., the part being edited in this example) is unavailable in the provider's infrastructure or otherwise non-locatable.

Another feature of the pop-up window 308 may be a drop-down menu 316 (or other feature) that allows a user to select a "part class" for the particular part name or number provided in column 280. Here, while each of the part names or numbers shown in column 280 is, in this example, a "master" part name or number, a user may be able to use the drop-down menu 316 (and/or other user manipulable features) to make a particular part number a "secondary" part number, "tertiary" part number, or other type of alias part number of another part number in which case such part numbers would be appropriately linked and cross-referenced in the database 304. In one arrangement, the alias part number could be removed from column 280 and could populate an appropriate cell in the pop-up window 308 of the master part number (not shown). While also not shown, the portal 136 may include an "all parts" or other similar type of button 212 that, when manipulated, causes the display of a column showing all part numbers (i.e., whether master or alias part numbers) used in the provider's infrastructure. For instance, an administrator or other user, upon determining that two different part numbers in column 280 are really identifying the same physical part, could make one of the part numbers a "secondary" or "alias" part number of the other part number. Thus, the database 304 may be a dynamic, evolving database that can become more accurate over time with continued user inputs, modifications, etc. As a result, the fuzzy searching module 404 may utilize the database 304 to enhance the ability of many of the other modules and functionalities disclosed herein (which will be discussed more fully below) to more efficiently manage and monitor asset movement and disposition within a provider's infrastructure.

Figure 8:
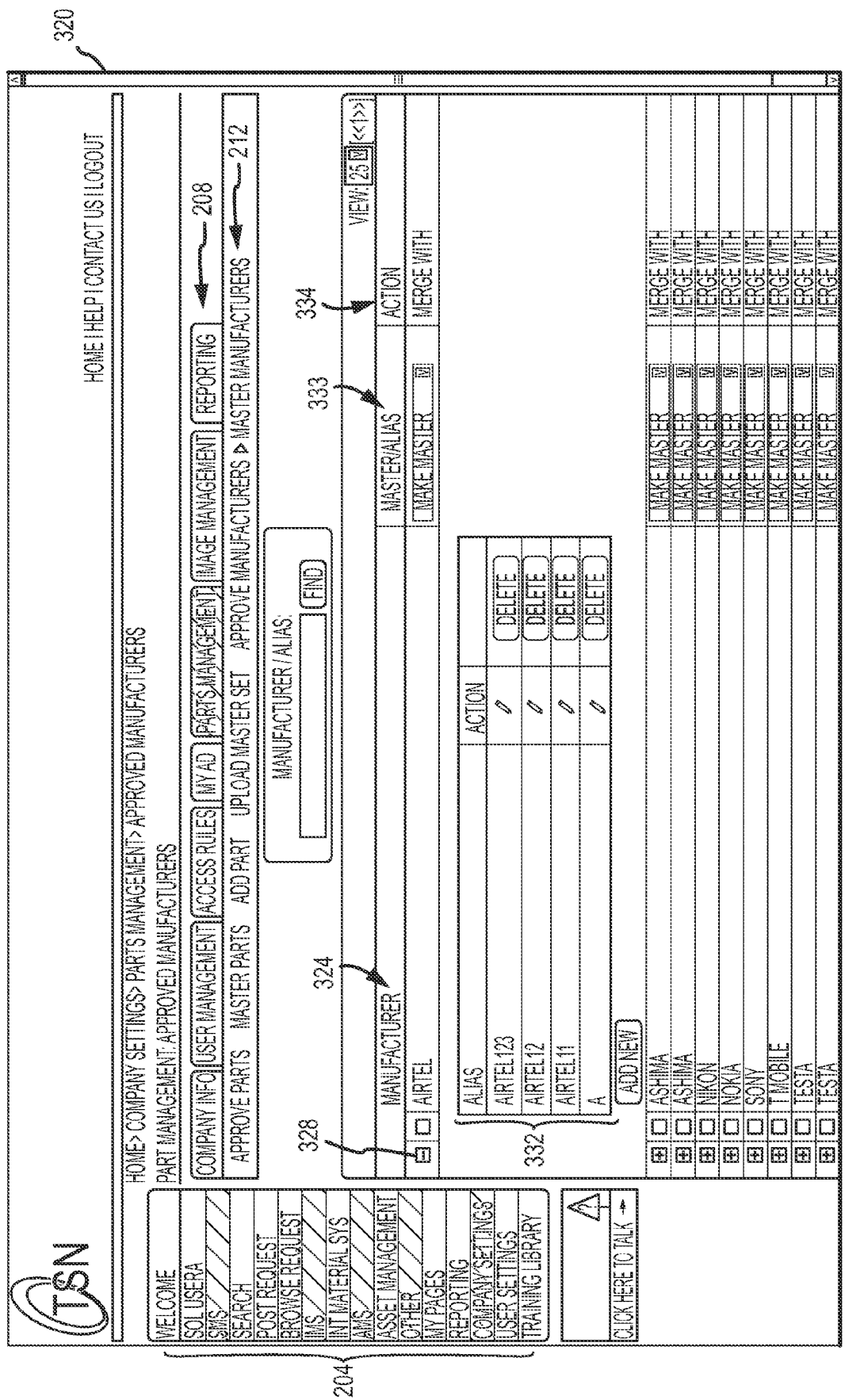

Turning now to FIG. 8, another screenshot 320 may be presented to a user upon manipulation of a "master manufacturers" button 212. As shown, this screenshot 320 may include a "manufacturer" column 324 that indicates a number of master manufacturer names or numbers used in the infrastructure. For each name in the column 324, an expand button 328 (or other feature) may be provided that, when manipulated, may cause the display of a column 332 listing any alias manufacturer names corresponding to the particular master manufacturer name. Like the alias part numbers, each of the alias manufacturer names are provided as a way of saying that a first alias name (e.g., "airtel123" in FIG. 8) is the same as a second alias name (e.g., "airtel11" in FIG. 8), both of which correspond to a master name (e.g., "Airtel" in FIG. 8). In this regard, the fuzzy searching module 404, upon accessing the database 304 and performing appropriate cross-referencing, would be able to surmise that the first and second alias names are really referring to the same manufacturer.

For instance, imagine that users associated with first and second locations within a provider's infrastructure both enter the same part number (e.g., "AUA23") but different manufacturer names into the portal 136 for storage in a customer asset database 339 (e.g., which includes available part or asset quantities at each of the locations) and/or a BOMs database 340 (e.g., which includes one or more BOMs of projects associated with each of the locations). Some previous systems would only consider the part numbers and possibly incorrectly assume that the two locations are referring to the same physical part (because, for instance, different manufacturers may utilize the same part number). However, the fuzzy searching module 404 includes one or more layers of cross-referencing to confirm whether or not the two locations are referring to the same physical part. For instance, the fuzzy searching module 404 may access the database 304 to determine whether the different manufacturer names are referring to the same manufacturer (e.g., if one name is an alias of another) or different manufacturers (in which case the two entries from the first and second locations are referring to different part numbers, despite using the exact same part number). Additional types of cross-referencing may be included.

With continued reference to the screenshot 320 of FIG. 8 and similar to the management of part numbers, a user may be able to appropriately set master manufacturer names, aliases thereof, and the like. For instance, the screenshot 320 may include a "master/alias" column 333 including a plurality of drop-down menus (or other features) that allow a user to selectively opt to make a particular manufacturer name a master or an alias. In the case where a user opts to make a first of the manufacturer names in column 324 an alias name, the user could manipulate the appropriate drop-down menu in the column 333 to cause "make alias" to be displayed, and then manipulate an appropriate "merge with" drop-down menu (or other feature) in an "action" column 334 to select a second of the manufacturer names in the column 324 of which the first manufacturer name is to be an alias. As with the part number information, the manufacturer name information may be appropriately stored in the customer parts database 304 or other appropriate database so as to be cross-referenced against the part number information.

The screenshots 276, 306, 320 may also include "add part" and "upload master set" buttons 212 that, upon manipulation thereof, cause the presentation of screenshots (not shown) that allow a service provider user to respectively input additional individual parts or upload a portion or an entirety of a customer master parts set (e.g., in the form of one or more data structures including part numbers, internal codes, etc.) into the customer master parts database 304 for use by the various functionalities disclosed herein (e.g., from corresponding customer master parts and customer asset databases 109, 110, see FIG. 1). Furthermore, the screenshots 276, 306, 320 may include "approve parts" and "approve manufacturers" buttons 212 that, upon manipulation thereof, cause the presentation of screenshots (not shown) that allow a user to indicate one or more parts or manufacturers as being "masters" or "aliases" in the event that the one or more parts or manufacturer names are not recognized by the fuzzy searching module 404. For instance, in addition to any customer parts information that was previously loaded and stored in the database 304, the server 104 may also include at least one "default" master parts database 305 including information similar to that discussed above (e.g., part numbers, manufacturer names, etc.) and that may gathered from one or more previously stored master parts databases (e.g., from the same or different service providers). In this regard, use of the "add part" and/or "upload master set" buttons 212 to input or upload part numbers may cause the fuzzy searching module 400 to search (e.g., via cross-referencing) for any previously loaded information corresponding to the same physical part or manufacturer and, in the event of a failure to identify previously stored information, cause the screenshots corresponding to the "approve part" and "approve manufacturer" buttons 212 to display one or more parts or manufacturers to identify as being masters or aliases (of another master).

In one arrangement, the fuzzy searching module 404, concentric searching module 406 (discussed below) and/or other functionalities disclosed herein may utilize kitting (i.e., the placement or association of two or more items or parts together to form one group or one single item). For instance, during the loading of inventory by service providers, kitting may be used to identify a specific part number being loaded into the server 104. That is, while a user may enter part identifying information corresponding to only a single part, the fuzzy searching module 404 may understand that the particular identifying information actually corresponds to a specific grouping of other parts and specific quantities of these parts. For instance, while a user may be able to observe the single entered part number or line item, the user may also be able to go into a "kitting" screenshot or view and observe the actual listings and levels of all the parts associated with that "kit." The kit could simply be a single level of a grouping of various parts or be a mixture of parts and other kits. With this knowledge, users could continue to drill down to the multiple levels that could be contained within increasing numbers of kits. For instance, a service provider can not only designate the parts within a kit and groupings of kits within kits with endless levels or groupings, but the lowest level parts within such kits may be tied into the customer master parts database 304.

Figure 9:
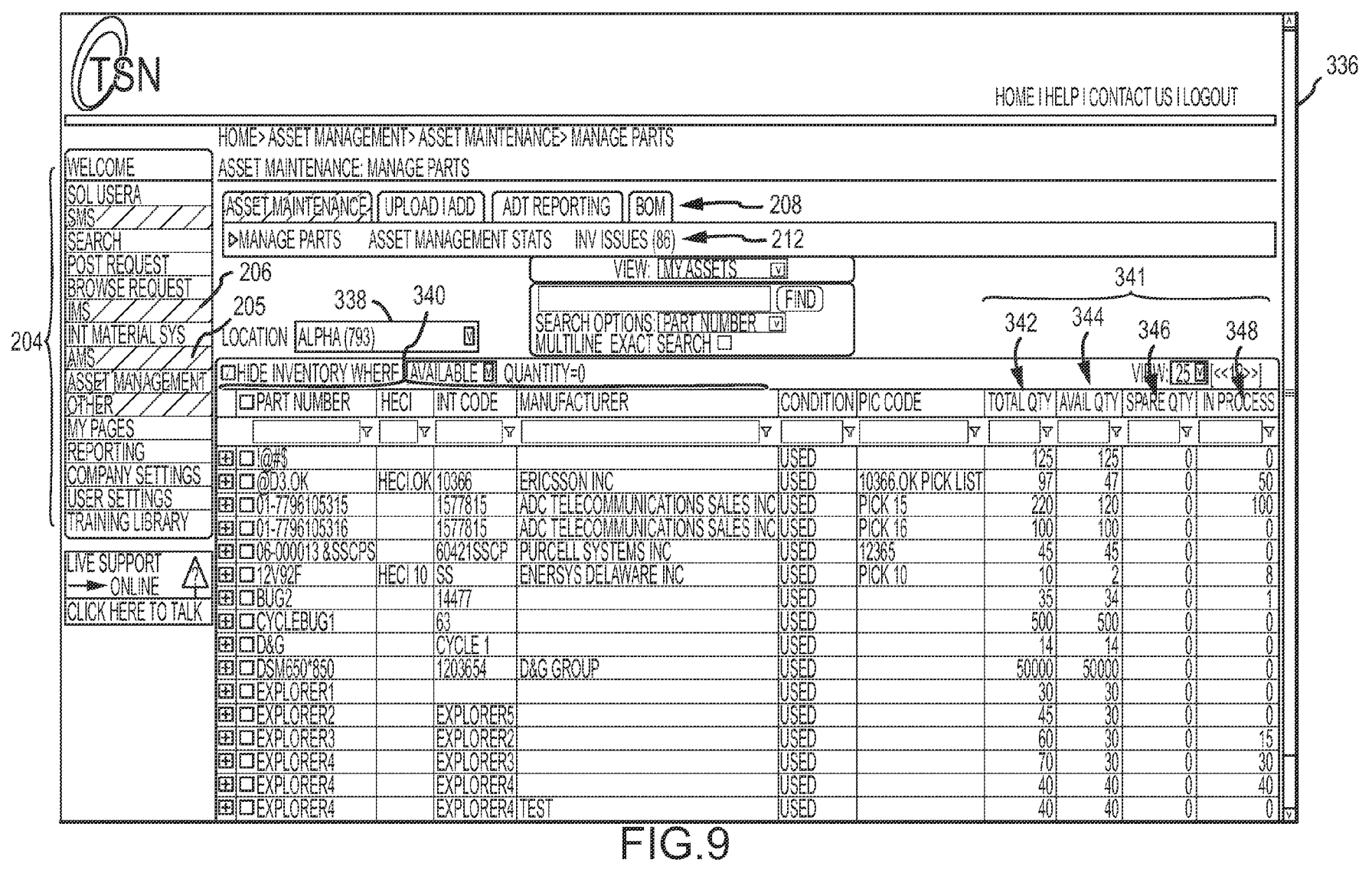

Turning now to FIG. 9, another screenshot 336 may be illustrated upon manipulation of an "asset management" button 204 under an AMS (asset management system) tab 205 of the portal 136. In additional to the AMS tab 205, the portal 136 also includes an IMS (internal material system) tab 206. For reference and as used herein, the AMS can be thought of as the collection of modules, processes and functionalities of the system 100 disclosed herein that are generally responsible for maintaining and providing inventory statuses and views of on-hand or local parts and materials of a particular infrastructure location, allowing for the posting of local parts into one of a number of "processes," and the like. As also used herein, IMS can be thought of as the collection of modules, processes and functionalities of the system 100 disclosed herein that are generally responsible for enabling movement of assets to where they are needed within the provider's infrastructure, detecting and allowing for the reconciliation of delivery discrepancies between infrastructure locations, and the like. It will be appreciated throughout this discussion how the AMS and IMS are operable to seamlessly function together to enable service providers to efficiently utilize their internal inventories (i.e., those assets intended for internal consumption as opposed to assets intended for use in products for end-users outside of the provider's infrastructure).

As illustrated, manipulation of an "asset maintenance" button 208 and a "manage parts" button 212 may cause the display of part identification information (e.g., at least some of that shown in FIG. 6) as well as quantity levels, statuses, etc. for a desired location within a provider infrastructure market and/or region. The screenshot 336 may include a drop-down menu 338 (or other feature) that allows a user to select a desired infrastructure location (e.g., as shown, an "alpha" location) along with a number of columns that include information specific to each of a number of parts associated with the selected location. For instance, the screenshot 336 may include a plurality of columns 340 that include identifying information for each of a plurality of parts (e.g., part number, HECI, internal code, manufacturer, etc.).

The screenshot 336 may also include a plurality of columns 341 that indicate various inventory levels or metrics for each of the parts. One of the columns 341 may be an "available quantity" column 344 that provides an indication (e.g., numerical) of a quantity of each of the various parts of the selected location that is "available" to be put into one or more "processes" as will be discussed in more detail below. Another of the columns 341 may be a "spare quantity" column 346 that provides a quantity of each part that is being reserved for one or more purposes or otherwise withheld from allocation to one or more of the processes. Another of the columns 341 may be an "in process" column 348 that provides the quantity of each part that is currently in a process. It should be understood that the quantities in the columns 344, 346 and 348 are mutually exclusive (e.g., a part quantity that is "available" cannot also be "spare" or "in process"). In any case, there may also be a "total quantity" column 342 that provides an indication of a summation of values of the columns 344, 346 and 348 for each part.

Figure 10:
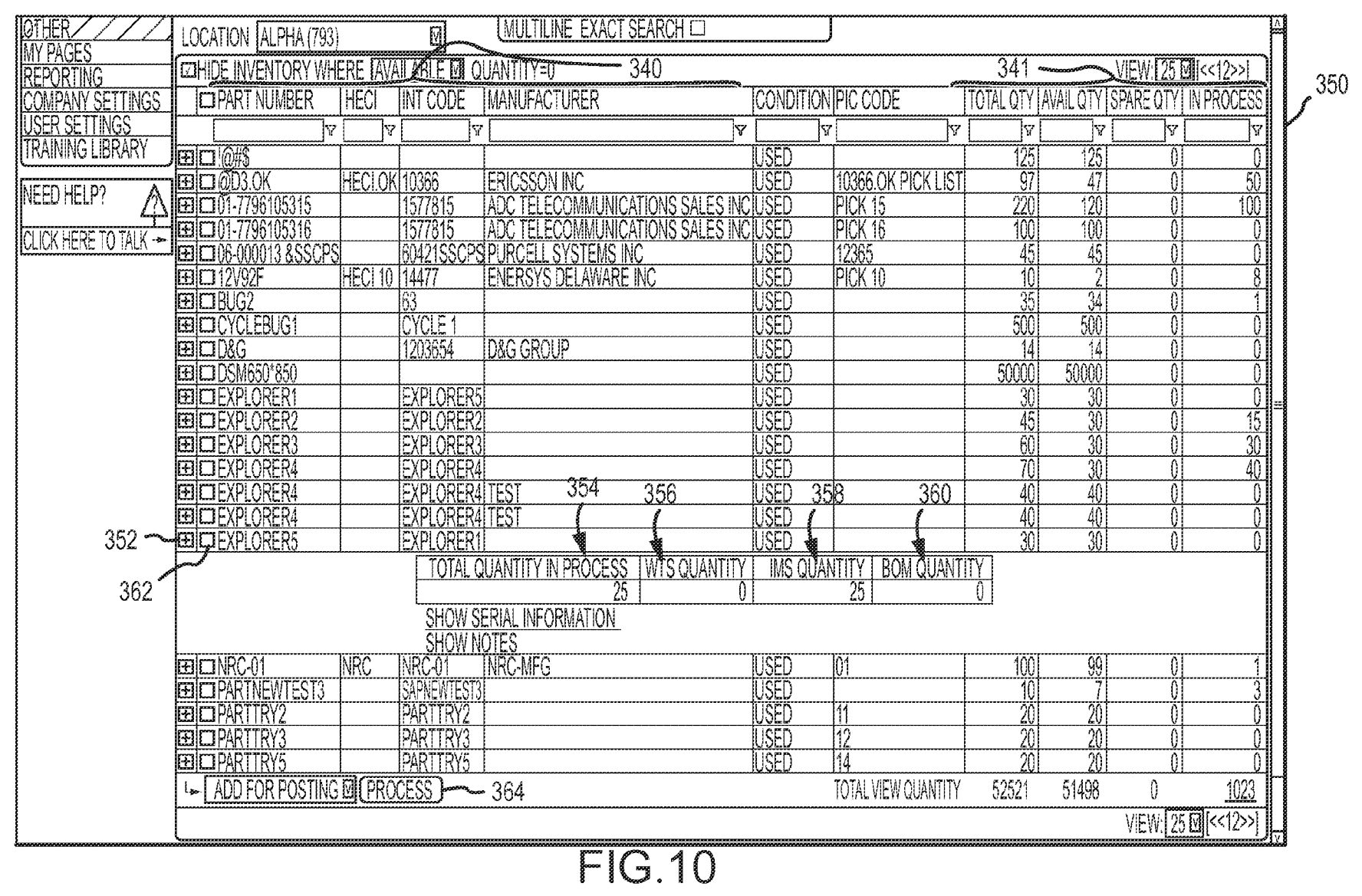

For a greater understanding of the "processes" that available part quantities may be put into, reference is now made to the screenshot 350 of FIG. 10. As shown, an expand button 352 (or other feature) of a particular part has been manipulated to cause the display of a number of cells that specify the various processes into which quantities of the particular part are currently allocated. One cell may be a "WTS quantity" cell 356 ("Want To Sell" quantity cell) that indicates the quantity of the particular part that has been consigned to a dealer or other party for sale on a secondary market or at least has been requested to be sold on a secondary market. Another cell may be an "IMS quantity" cell 358 that indicates that quantity of the particular part that has been allocated for possible use or consumption by BOMs originating from infrastructure locations other than the current location (e.g., the location selected in drop-down menu 338 in FIG. 9). Another cell may be a "BOM quantity" cell 360 that indicates the quantity of the particular part that has been allocated to BOMs originating from the current location. The screenshot 350 may also include a "total quantity in process" cell 354 that is a summation of the cells 356, 358, 360 and which corresponds to the value in the "in process" cell 348 for the particular part from FIG. 9.

As discussed above, part quantities associated with infrastructure locations can be put into one or more processes such as moving the part quantities from one infrastructure location to another infrastructure location to fulfill a BOM line item, posting a part quantity into an MA status, consigning the parts to a dealer, and the like. As will be discussed more fully below, BOMs originating from a particular location (e.g., the "alpha" location as selected and shown in FIGS. 9-10) may first be fulfilled from "available" quantities (e.g., see column 344 in FIG. 9) of the particular location. For instance, part quantities associated with an "Alpha" location that are currently allocated to BOMs originating from the Alpha location may be added to the "BOM quantity" cell 360 as being currently assigned to a BOM process. In the event that a particular part quantity has been in an "available" status for more than a predetermined or desired period of time (e.g., a time period indicating that the part quantity is becoming stale), users (e.g., regional material planners or RMPs) may opt to find other uses for such part quantities (e.g., by way of posting such part quantities into one or more processes).

Figure 11:
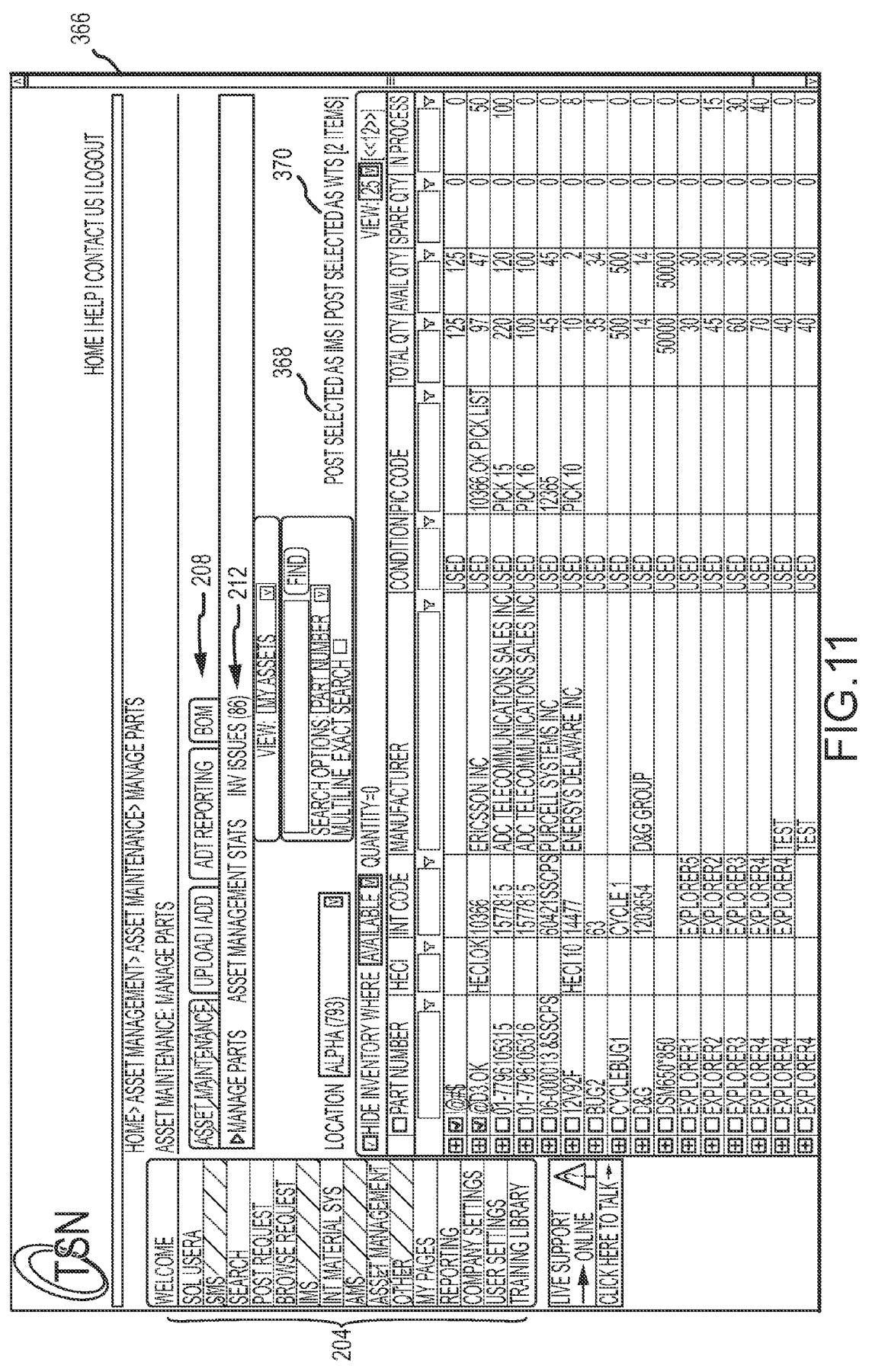
Figure 12:

With continued reference to FIG. 10, a user may appropriately select one or more desired parts which are to be posted into a process (e.g., via selecting a checkbox 362 or other user manipulable feature) and then select a "process" button 364 (or other feature); doing so may present the screenshot 366 of FIG. 11 which may include a "post selected as IMS" button 368 and a "post selected as WTS" button 370. For instance, before consigning the particular part quantities to a dealer for sale on a secondary market (which would be possible via manipulating the "post selected as WTS" button 370, a user may desire to make the part quantities available for consumption by BOMs originating from other locations within the provider's infrastructure (e.g., such as by sending the part quantities into a process that changes a status of the part quantities into a "material available" (MA) status indicating that the part quantities can be consumed by other locations within the infrastructure). In this regard, manipulation of the "post selected as IMS" button 368 may cause the display of the screenshot 372 in FIG. 12 which allows the user to select a particular quantity of the "available" quantity of each of the particular parts to be submitted to IMS for possible consumption by other infrastructure locations (among other possible actions).

Upon selection of desired part quantities in appropriate cells 374 in the screenshot 372, the user may manipulate a "submit to IMS" button 376 that causes a status of the part quantities to be changed from an "available" status to another status (e.g., a "pending processing" status) where, for instance, such statuses may be appropriately stored in the customer asset database 339. Furthermore, opting to submit the particular part quantities to IMS may cause the generation of a "pending posting" line item or message that may be presented to any appropriate personnel or administrator (e.g., RMP) to determine whether and/or how the part quantities are to be made available to other infrastructure locations. Turning now to FIG. 13, another screenshot 380 of the portal 136 is shown up manipulation of the "submit to IMS" button 376 and that presents a plurality of processes for a corresponding plurality of part quantities as uploaded by one or more users (e.g., personnel associated with infrastructure locations where such part quantities reside) to be acted on by an RMP or other appropriate personnel (e.g., to move the part quantities into another process). Alternatively, an RMP or other personnel may access the screenshot 380 upon manipulation of an "Internal Material System" button 204 and a "pending postings" button 208.

In any case, the screenshot 380 may include a number of columns that include information for the plurality of processes such as, inter alia, a "process ID" column 382 that displays a unique ID to be used by system components and functionalities to monitor and keep track of the processing for a particular part quantity, an "action" column 384 including a number of buttons or other user manipulable features that allow an RMP to take a particular action (discussed below) with respect to a particular process, among other columns (e.g., upload date, partly responsible for upload, status, part quantity, etc.). An RMP or other personnel may peruse the processes in the screenshot 380 to determine which process (es) to take action on. For instance, the RMP may choose to address pending processes according to upload date (e.g., via addressing the oldest first), part quantity, and/or in any other appropriate manner. Once the RMP has decided which process to act on, the "RMP action" button (or other feature) corresponding to the particular process in the "action" column 384 may be manipulated to allow the RMP to take one or more appropriate actions with respect to the pending part quantity process.

Figure 14:
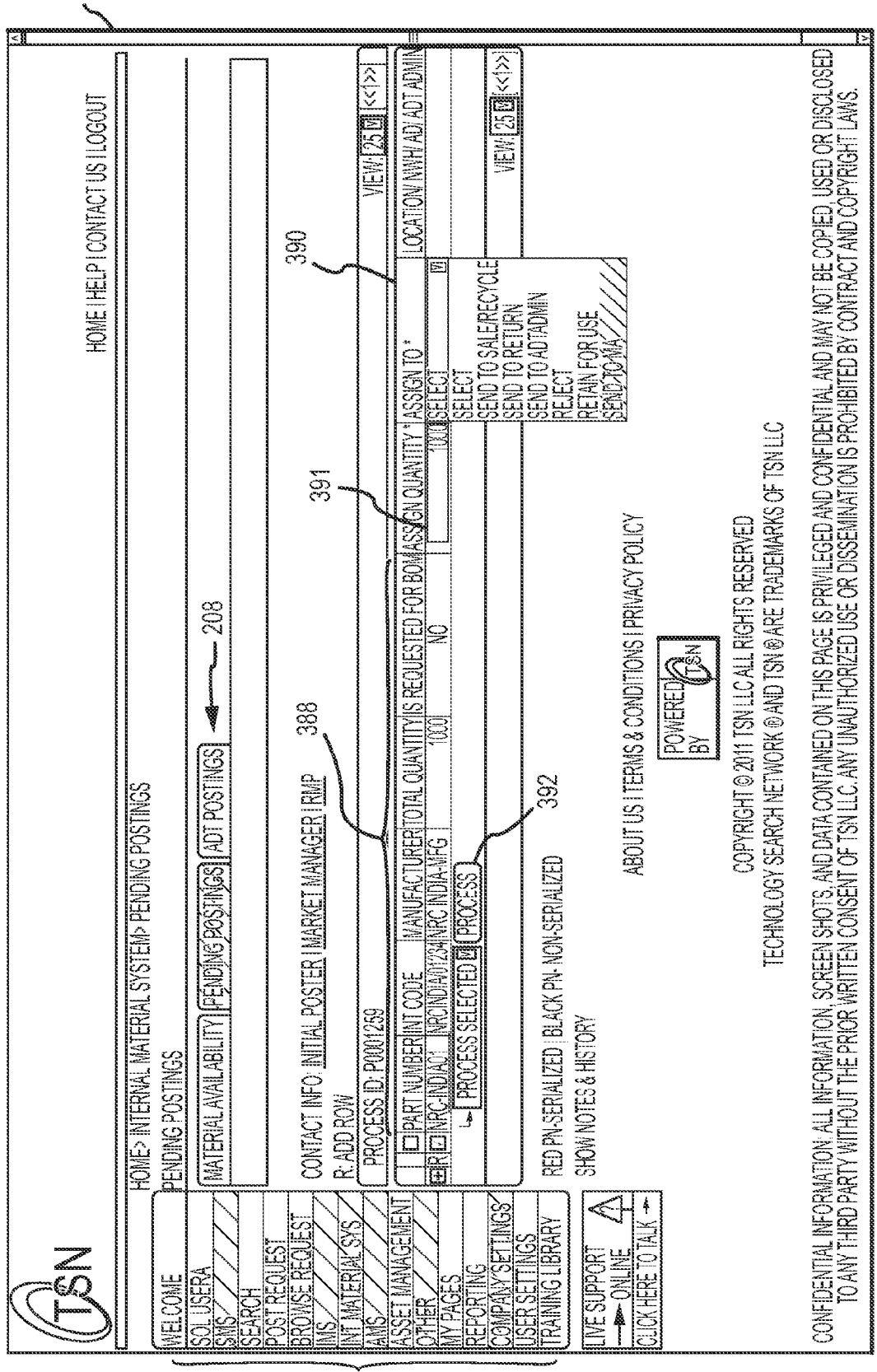

Turning now to FIG. 14, another screenshot 386 may be presented upon the RMP or other personnel deciding which process to take action on. In this screenshot 386, a number of cells 388 may be presented which may be populated with part identifying information (e.g., at least some of that shown in the screenshot 276 of FIG. 6), inventory information (e.g., total quantity uploaded for IMS processing), and the like. The screenshot 386 may also include a drop-down menu 390 (or other feature) that allows the RMP to select one of a number of actions to take with respect to the part in addition to cell 391 (or other feature) that allows the RMP to choose the specific amount of the total quantity of the part for which the action is to be taken such as the entire total quantity or some portion of the total quantity (e.g., the cell 391 may be initially automatically populated with the total quantity). As shown in the drop-down menu 390, the RMP may opt to send the selected part quantity to sale/recycle (e.g., via consigning the part quantity to a dealer), return (e.g., returning the part quantity to the originating location in "available" status), ADT/administrator (e.g., which allows for tracking of serialized assets), or MA (i.e., make the part quantity available for consumption by infrastructure locations other than the location from which the part quantity process was uploaded). The RMP may also choose to reject the part quantity from processing (e.g., via returning the part quantity to the "available" status at the originating location) or retain the part quantity for use. Upon selection of a particular part quantity in cell 391 and a particular action to take in drop-down menu 390, the RMP or other user may select a "process" button in order to take the selected action for the selected part quantity. The particular process ID (from the process ID column in FIG. 13) may then be appropriately linked or bound to the selected process (e.g., sale/recycle, MA status, etc.) in the system and appropriately stored in the customer asset database 339 for use or access by other components, modules and functionalities disclosed herein.

Figure 15:
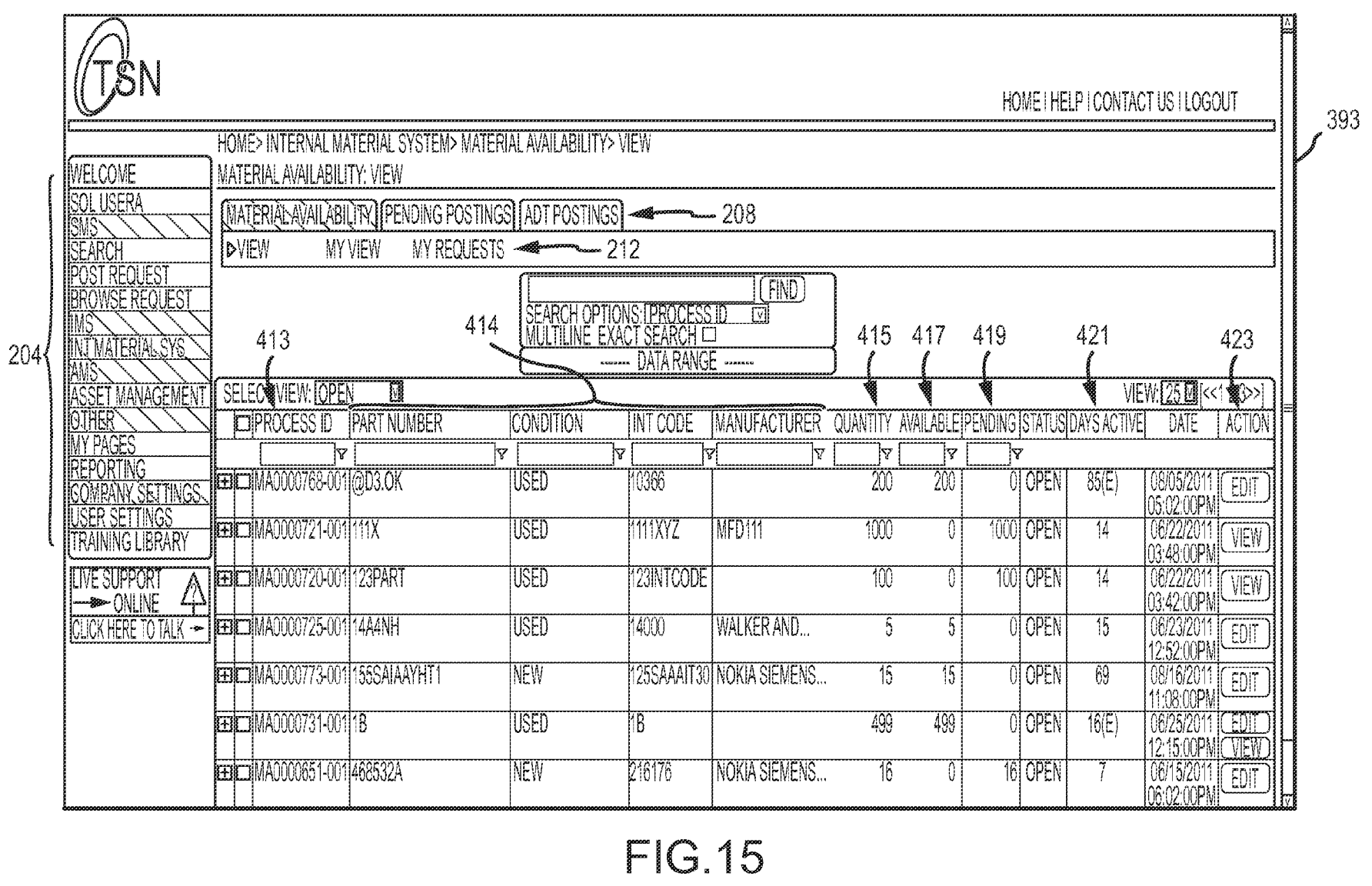

Turning now to FIG. 15, another screenshot 393 of the portal 136 may be presented upon manipulation of the "material availability" button 208 and the "view" or "my view" button 212. Generally, this screenshot 393 presents a list of part quantities from infrastructure locations that have been approved for MA status (where manipulation of the "view" button 212 presents part quantities in MA status originating from other locations and manipulation of the "my view" button 212 presents part quantities in MA status originating from a current or user-defined location). As with the other listings of data and information shown in other screenshots presented herein, the data shown in the screenshot 393 may be stored in any appropriate database in storage 124 for access by the portal 136. For instance, this screenshot 393 may include a "process ID" column 413 that includes identifiers that link approved part quantities to MA processes and thus MA statuses, a number of part identifying information columns 414 that include part numbers, internal codes, etc. representing the parts of each MA process, a "quantity" column 415 that provides the quantity of a particular part that is in MA status, an "available" column 417 that provides a numerical indication of the quantity of parts that is currently available for consumption by BOM line items, a "pending" column 419 that provides a numerical indication of the quantity of parts that have already been requested for a BOM of a particular infrastructure location, a "days active" column 421 that provides a number days (and/or other time increments) that the particular part quantity has been in MA status, an "action" column 423 that allows an RMP or other user to take one or more actions with respect to the particular part quantity (e.g., return to an "available" status at the originating location, send for sale/recycle, and the like), and/or one or more additional columns (e.g., status, time, etc.).

As discussed throughout this disclosure, the present functionalities and utilities advantageously allow technology service providers to implement "best practices" life-cycle management, asset disposition and asset tracking with enhanced visibility and accountability. In this regard, the server 104 may include what will be referred to as an "MA status" module 405 (see FIG. 1) that broadly serves to monitor the listing of part quantities that have been placed into an MA status and automatically "cleanse" the listing of part quantities that have remained in MA status for more than a user-defined period of time indicating that it may be more beneficial to take another action with respect to the particular part quantities (e.g., sending to sale/recycle, returning to originating location, etc.).

Figure 16:
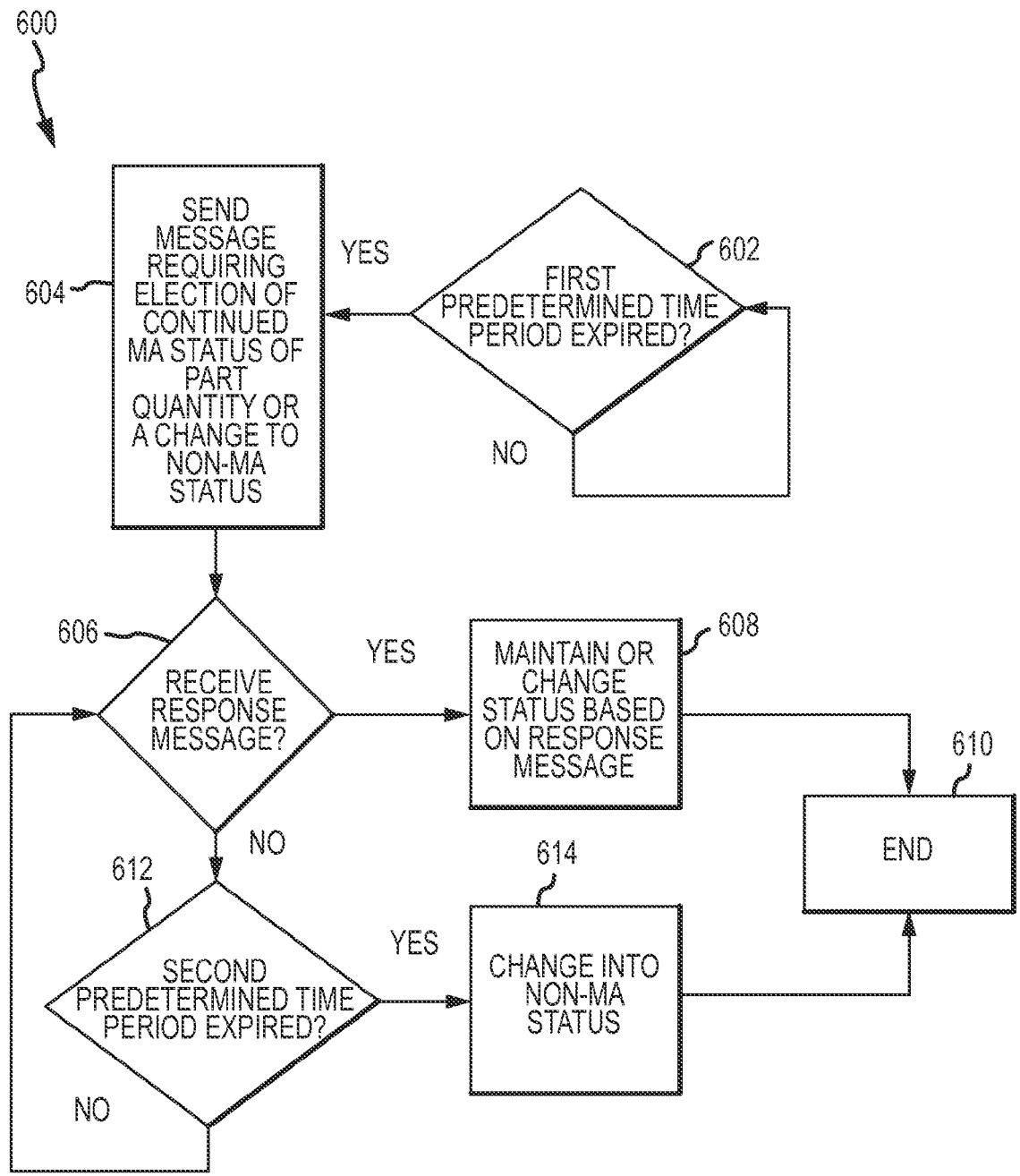
FIG. 16 is a flow diagram of a method for monitoring infrastructure asset quantities that have been associated with a "material available" status.

Turning now to FIG. 16, a method 600 is shown (which may be represented by the MA status module 405) that may be executed by the processor 120 for use in monitoring and cleansing the MA status listing shown in FIG. 15. The method 600 may include determining 602 whether a first predetermined time period has expired. For instance, RIVIPs or other users may, upon approving an MA status of a particular part quantity (e.g., in screenshot 386 of FIG. 14), select a particular period of time (e.g., 60 days, 90 days, etc.) for which the part quantity may stay "active" (e.g., in the absence of a user requesting the part quantity to fulfill a BOM line item). If the answer to the query at 602 is no, then the method 600 may continue to cycle back to 602. In response to a positive answer at 602 (i.e., a determination that the predetermined time period has expired), the method 600 may proceed to send 604 a message that requires election of either continued MA status of the part quantity or a change to one or more non-MA statuses (e.g., sent for sale, returned to originating location, etc.). For instance, an email or other type of message may be sent to the RMP or other user informing the user of the expiry of the first predetermined time period. In one arrangement, the first predetermined time period may be the time period selected by the user (e.g., 60 days, 90 days). In another arrangement, the first predetermined time period may be automatically backed out of the user-selected maximum days-active period. As just one example, if the user selected 60 days, the first predetermined time period may be 53 days or, in other words, one week before the user-selected 60 day period.

In any event, the method 600 may then inquire 606 whether a response message was received in response to the message sent at 604 indicating whether and how the status of the part quantity is to be changed. In response to a positive answer at 606, the method 600 may proceed to maintain or change 608 the part quantity status based on the response message and end 610 (and/or return to one or more steps of the method 600). For instance, if the response message included instructions to maintain MA status for an additional 60 days, the method 600 may proceed to do so and reset the first or other predetermined time period and return to 602. As another example, if the response message included instructions to send the part quantity for sale by an approved dealer, the method 600 may proceed to change the status of the part quantity to "sent to dealer" or other appropriate status (e.g., by disassociating the part quantity from the particular process ID shown in column 413 of FIG. 15) and end at 610.

In response to a negative answer at 606, the method 600 may proceed to query 612 whether a second predetermined time period has expired. For instance, the RMP or other use may be given a period of time (e.g., day(s), week(s), etc.) within which to respond to the election requirement sent at 604. In response to a negative answer at 612, the method 600 may proceed to cycle back to 606 to make another inquiry. In response to a positive answer at 612, the method 600 may proceed to automatically change 614 the status of the particular part quantity from an MA status to any appropriate non-MA status (e.g., a "returned to originating location" or other appropriate status). As can be appreciated, the method 600 advantageous serves to avoid or at least limit the maintaining of "stale" part quantities in MA status that may be more efficiently utilized elsewhere in the provider's infrastructure or even on a secondary market.

Briefly returning to the screenshot 336 of FIG. 9, another button that may be available to a user upon manipulation of the "asset management" button 204 may be a "BOM" button 208. Broadly, manipulation of the BOM button 208 allows a user to observe the status of BOMs (e.g., data structures including originating or "requested from" locations; one or more line items including part identifying information such as part numbers, internal codes, manufacturer names etc. as well as requested quantity numbers; and the like) originating from projects associated with one or more desired locations within the provider's infrastructure, issue one or more BOMs, upload one or more BOMs, and the like. Initially, one or more users may select a "BOM upload" button 212 to cause the display of a screenshot (not shown) that allows the users to upload one or more BOMs for one or more projects associated with any desired infrastructure location(s). Stated differently, each BOM may be uploaded from the perspective of a particular infrastructure location, where each location may be located within a particular market, and each market may be located within a particular region (see above discussion in relation to FIGS. 3-5). Each BOM may generally be in the form of a data structure made up of one or more line items, where each line item represents a quantity of a particular part requested for at least one project associated with the particular infrastructure location. To create and upload a BOM, users may populate each line item (not shown) with any appropriate part identifying information (e.g., at least some of that shown in the screenshot 276 of FIG. 6, such as part number, manufacturer name, internal code, etc.), requested quantities, and the like. Upon creation of a BOM, the BOM may be tagged with a "BOM ID" (or other unique identifier) and uploaded to the server 104 (e.g., to a BOM database 340).

Upon upload of a BOM to the server 104 and/or at any other appropriate time (e.g., according to a predetermined schedule), the server 104 may function to fulfill the various line items of the BOM from assets of the service provider. In this regard, the memory 116 of the server 104 may include what will be referred to as a "concentric parts searching module" 406 that broadly serves to initially consider available or "on-hand" or excess inventory of the original infrastructure location from which the BOM was uploaded (i.e., inventory that is not currently allocated to a particular project and not currently planned to be used) followed by successive considerations of infrastructure locations that are more and more remote from the original location in terms of infrastructure levels.

Figure 17:
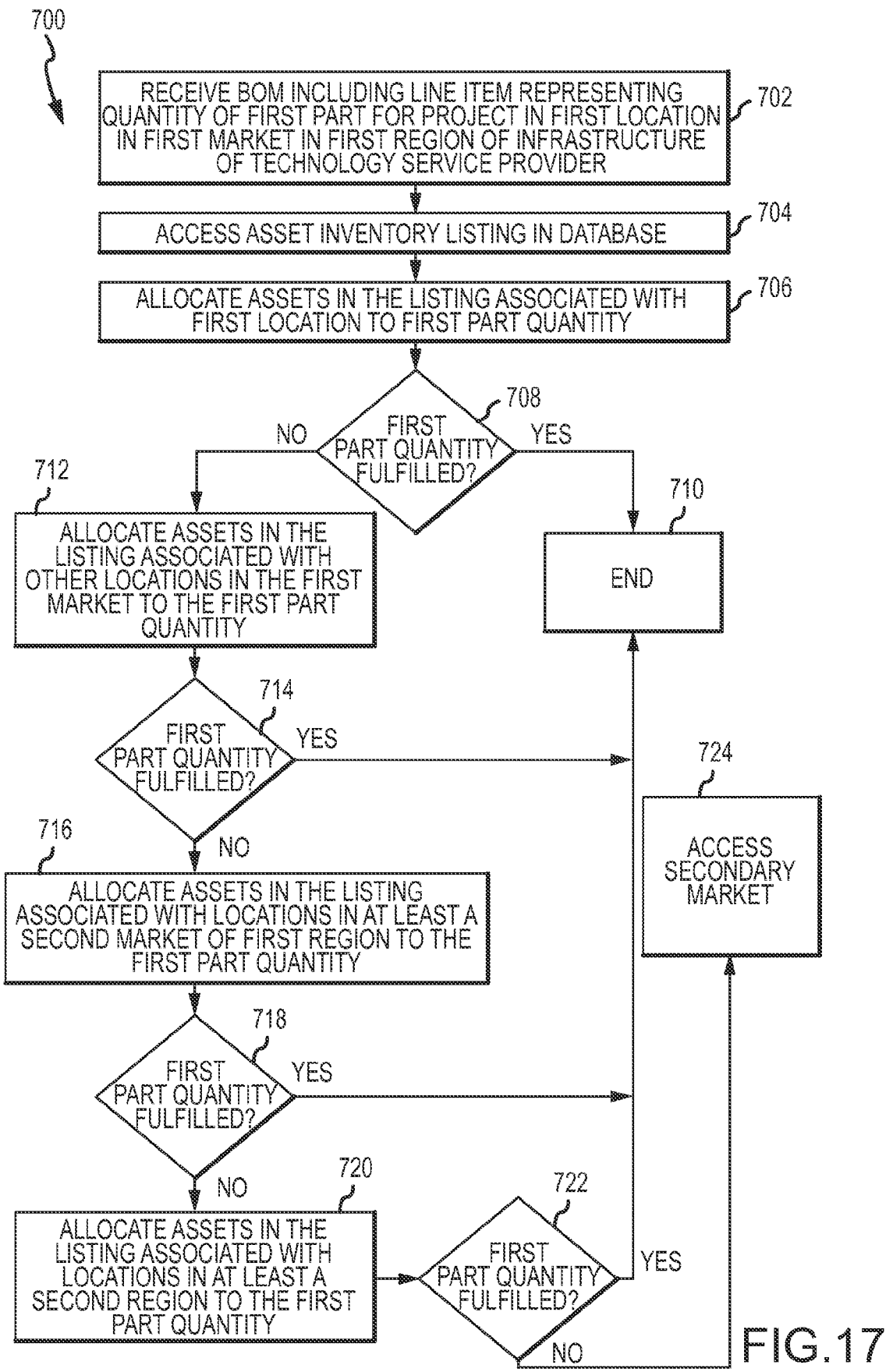
FIG. 17 is a flow diagram of a method for performing concentric searching of assets within a provider's infrastructure to fulfill BOM line items.

With reference now to FIG. 17, a method 700 is shown (which may be represented by the concentric searching module 406) that may be executed by the processor 120 for use in fulfilling one or more BOM line items. The method 700 may include receiving 702 a BOM including at least one line item representing a quantity of a first part for a project in a first location in a first market of a service provider's infrastructure. For instance, and as discussed above, various users of a particular service provider infrastructure may upload BOMs from the perspective of various locations within the infrastructure (it is noted that the BOM need not necessarily be literally uploaded from a computer physically within the particular location or warehouse) which may be received at the server 104 and appropriately stored (e.g., in BOMs database 340). The method 700 may then include accessing 704 an asset inventory listing in a database (e.g., customer asset database 339) and "softly" allocating 706 matching assets in the listing that are associated with the first location to the first part quantity.

As an example, imagine that the BOM was uploaded from a location "Alpha" within a particular service provider's infrastructure and that the BOM included a line item having a quantity of 200 of a part identified by a part number of "@D3.0K" and a manufacturer named "Ericsson Inc." Returning briefly to FIG. 9, the screenshot 336 illustrates, as discussed previously, asset inventory information for the location "Alpha." As shown in the second row in the list of parts, the Alpha location includes a part identified by the part number "@D3.0K" and manufacturer "Ericsson Inc." As also shown, there is an "available" quantity of 47 of this part at the Alpha location. In this regard, the concentric searching module 406 may serve to allocate (e.g., "softly" allocated) all 47 of the available quantity of the part to the BOM. Accordingly, the available quantity of this part may be reduced to zero in the screenshot 336 while the "in process" quantity of this part may be increased to 97 in the screenshot 336 (a summation of the 50 already in process and the 47 newly in process).

The concentric searching module 406 may utilize or otherwise work in conjunction with the fuzzy searching module 404 as part of locating and identifying parts to fulfill BOM requests. For instance, imagine that, instead of "@D3.0K," the user who uploaded the BOM utilized "10366" in the line item to identify the desired part. In this case, the fuzzy searching module 404 may serve to identify "10366" as an internal code, and then determine, via cross-referencing, that the desired part corresponds to the part number "@D3.0K." Therefore, the part number "@D3.0K" may be used as part of identifying matching asset quantities of the infrastructure. As another example, imagine that the user loaded a manufacturer name of "Erc" instead of "Ericsson, Inc." Here, the fuzzy searching module 404 may serve to recognize "Erc" as an alias manufacturer name of a master name of "Ericsson, Inc." (e.g., see column 332 in FIG. 8) to confirm that the correct part has been identified (e.g., in the event that different manufacturers both utilized "@D3.0K" to identify the same physical part). Numerous other examples exist of how the fuzzy searching module 404 may function to identify the appropriate part requested in a BOM line item.

In any case, the method 700 may query 708 whether the first part quantity has been fulfilled and end 710 in response to affirmative answer to the query 708. In the event the first part quantity has not been fulfilled (as in the above example where only 47 of the requested 200 were fulfilled from "on-hand" inventory of the originating infrastructure location), the method 700 may proceed to allocate 712 any assets in the inventory listing (e.g., the customer asset database 339) associated with other locations in the first market to the first part quantity (i.e., any portion of the part quantity not fulfilled by on-hand inventory in step 706). For instance, and returning to FIG. 5, the Alpha location from which the present BOM was loaded from may be located within a first market named "Main Market" along with a number of other locations such as "Arvind," "Atlanta," "Augusta," and "Las Vegas."

Here, the method 700 proceeds to collectively (e.g., free of regard to any relation between the originating location and the other market locations, other than being located within the same market) consider any matching assets from all of the locations within the "Main Market" that have an MA status (e.g., from a plurality of data structures similar to that in FIG. 9 for each of such locations). As discussed above in relation to FIGS. 10-14, assets that have been placed into an MA status may be available for consumption by line items of BOMs that originate from locations other than the location where the assets currently reside or are otherwise assigned to. As also discussed previously, a number of physical locations may be placed within the same "market" for a number of accounting and/or other reasons. In this regard, consideration of "matching" assets in MA status from such locations (i.e., in the event that the originating location cannot satisfy or fulfill all of the requested part quantities) may be more beneficial than other locations (e.g., even if located geographically closer to the originating location than locations within the first market) or even secondary market sources due to such accounting and/or other financial reasons.

Again, the method 700 may query 714 whether the first part quantity has been fulfilled and end 710 in response to an affirmative answer to the query 714. In the event the first part quantity has not been fulfilled, the method may proceed to allocate any assets in the inventory listing associated with locations within at least a second market to the first part quantity (i.e., any portion of the part quantity not fulfilled by steps 706 and 712), where the first and second markets are located within a common first region. For instance, and returning to FIG. 4, "Main Market" is located within a region named "Main Region," along with other markets named "Corporate," "Gaj Market," "Main," and "testnwh." Here, the method 700 would proceed to collectively consider any matching assets from all locations within one or more (e.g., all) of the Corporate, Gaj Market, Main and testnwh markets that have an MA status, and softly allocate such assets to the first part quantity accordingly.

The method 700 may then query 718 whether the first part quantity has been fulfilled and end 710 in response to an affirmative answer to the query 718. In the event the first part quantity has not been fulfilled, the method 700 may proceed to allocate any assets in the inventory listing associated with at least a second region of the provider infrastructure to the first part quantity (i.e., any portion of the part quantity not fulfilled by steps 706, 712 and 716). For instance, and returning to FIG. 3, the provider's infrastructure may include a number of other regions such as "Test region 1," "Test region 2," etc. In this regard, the method 700 may proceed to collectively consider any matching assets from all locations within one or more (e.g., all) of Test Region 1, Test Region 2, etc. that have MA status and softly allocate such assets to the first part quantity accordingly. The method 700 may then again query 722 whether the first part quantity has been fulfilled and end 710 responsive to an affirmative answer to the query 722. In response to a negative answer to the query at 722, the method 700 may proceed to access any appropriate secondary market outside of the provider's infrastructure to locate corresponding matching assets.

In one arrangement, the concentric searching module 406 may utilize kitting as part of the searching process. For instance, when the module 406 is attempting to locate a kit (e.g., as identified by one or more of a kit number, code, etc.) associated with other infrastructure locations, it will look not only for that same kit but also for each of the multiple parts making up the kit. Stated differently, in the event that the particular kit is not identified from infrastructure assets, the module 406 may also proceed to search for all of the parts (and possibly alternate parts) that make up the kit individually throughout the provider's infrastructure. In one arrangement, a user may be notified of the need to go out and find the individual parts if the module 406 is unable to find a packaged "kit" in the infrastructure. In another arrangement, a user may be asked whether the user wants alternates to be substituted within a kit for a particular BOM line item. For instance, choosing to allow the alternate part may cause the module 406 to lock the alternate part to the particular BOM so that upon another kit being loaded within another BOM that needs to look for individual parts, the module 406 may again require a human decision to allow or deny use of the same alternate part within the BOM matching and pulling process.

Figure 18:
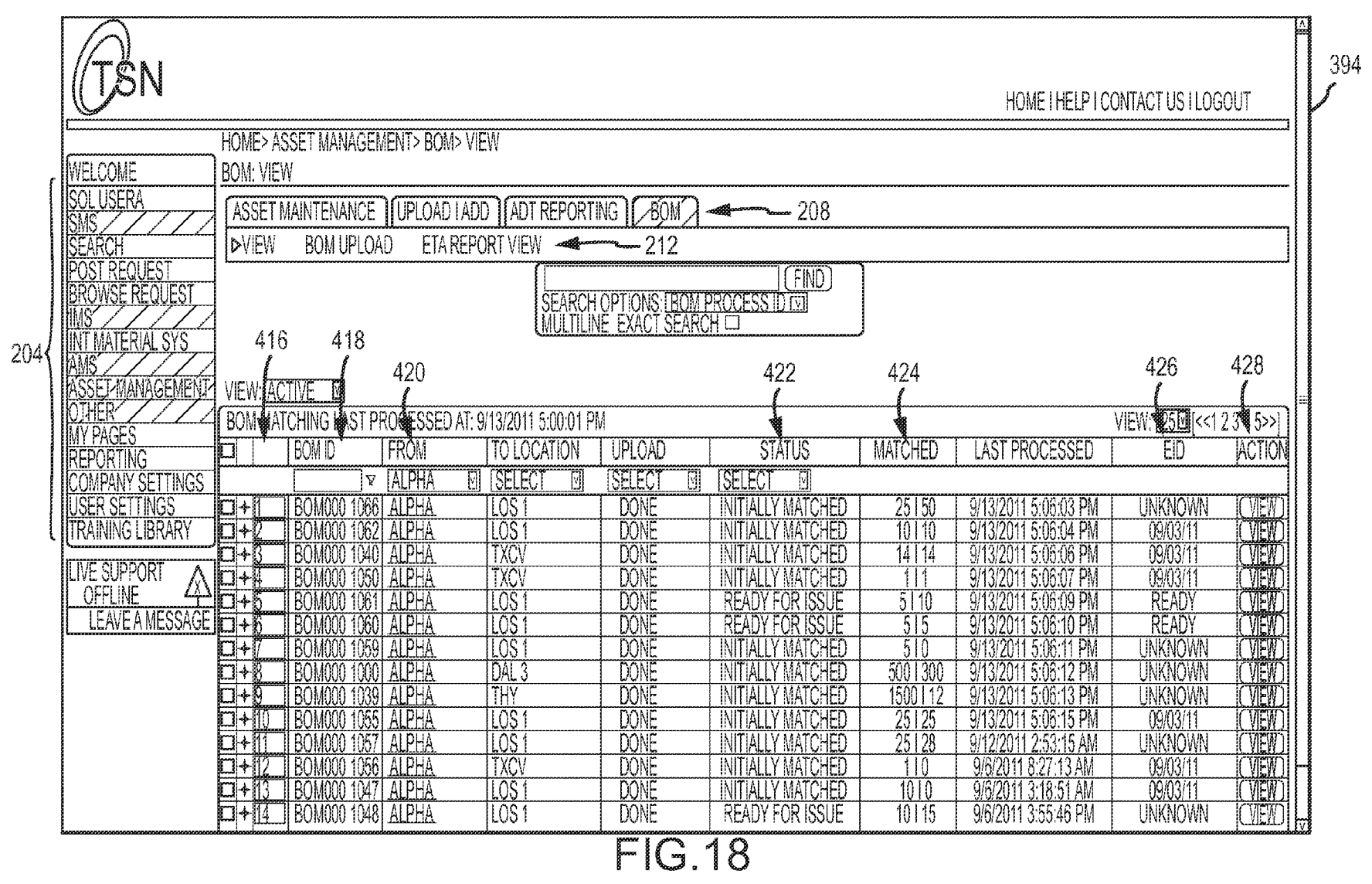

Turning now to FIG. 18, another screenshot 394 of the portal 136 may be presented to a user upon manipulation of the BOM button 208 and a "view" button 212. This screenshot 394 presents a list of all BOMs that have been uploaded from a particular infrastructure location for one or more projects associated with the particular infrastructure location and processed by the concentric searching module 406 (e.g., in conjunction with the fuzzy searching module 404) in an attempt to fulfill the various individual line items of the BOMs. The screenshot 394 may include a number of columns such as a priority column 416 (discussed in more detail below), a "BOM ID" column 418, a "from" column 420 (indicating which location the BOM was uploaded from), a "status" column 422 (e.g., initially matched, ready for issue, closed, etc.), a "matched" column 424 (discussed further below), an "EID" or "estimated issue date" column 426, an "action" column 428, and/or one or more other columns of information related to the BOMs.

For instance, a BOM having a status in the status column 422 of "initially matched" indicates that the concentric searching module 406 has made at least one attempt to search for and softly allocate matching assets to line item quantities of the BOM, but that any matching assets are not yet ready for issue. As another example, a BOM having a status of "ready for issue" indicates that not only has the concentric searching module 406 made at least one pass at locating and softly allocating matching assets to line item quantities of the BOM, but that at least some of the located matching assets can be immediately issued (e.g., because such matching assets were either originally on-hand at the originating location of the BOM upon loading of the BOM or are now on-hand after requesting match assets in MA status from another location).

With reference to the second BOM (e.g., having a BOM ID of "BOM0001062") in the list shown in FIG. 18, for instance, this BOM has a status of "initially matched" (see column 422) and a value in the matched column 424 of "10|10" which indicates that this BOM includes at least one line item representing a quantity of 10 of at least one part, and that all 10 of the at least one part have been matched to assets (but not yet ready for issue as the status in column 422 is only "initially matched" instead of "ready for issue"). Upon manipulation of the "view" button in column 428, a user may be presented with the screenshot 430 shown in FIG. 19 which provides more detailed information regarding the matching of infrastructure assets to the line item quantities of the BOM.

This screenshot 430 may include a number of portions (e.g., each of which may be appropriately expanded and collapsed) such as a "matched|ready to issue" portion 432, an "IMS>MA matches|requests" portion 434, a "matched—other|qty requested by email" portion 436 and/or an "unmatched|unordered" portion 438. Each of the portions 432-438 is broadly operable to provide BOM line item quantity status information in relation to various types of infrastructure assets. Portion 432 may generally provide an indication of the numbers of a particular line item quantity that have been matched by infrastructure assets and that are either ready to issue/be pulled or are currently in process to be delivered to the BOM originating location (in this case, the "Alpha" location).

Figure 19:
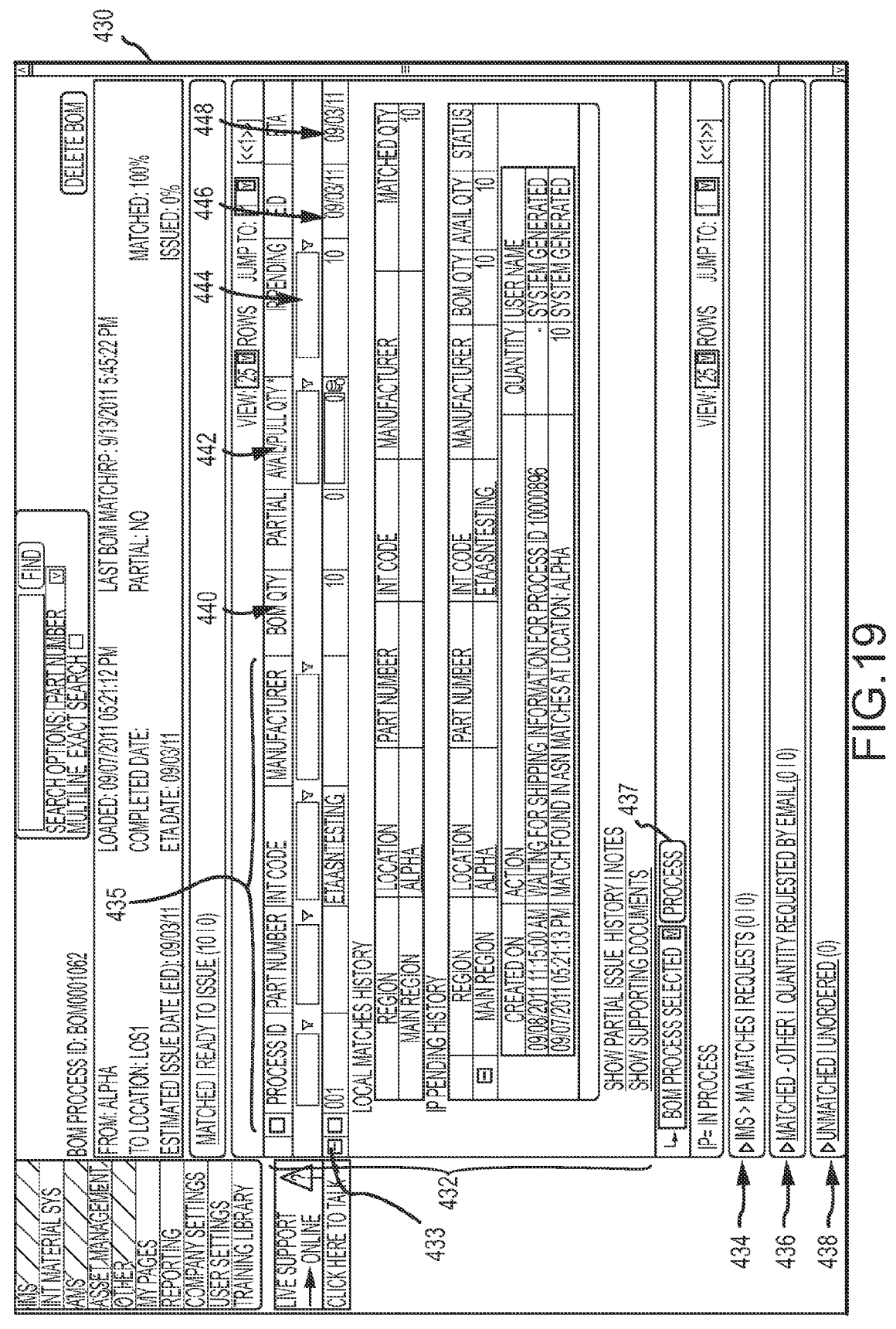

For instance, portion 432 in FIG. 19 may include a row 433 corresponding to a particular line item and having one or more cells 435 with part identifying information (e.g., part number, internal code, manufacturer name, etc.), a cell 440 that displays the requested quantity of this line item of the BOM, a cell 442 that displays an available to pull/issue quantity (in this example, zero), a cell 444 that displays the quantity that is currently in process to be delivered to the originating location and has thus been "softly" allocated to the requested line item quantity (in this example, 10, or in other words, the entire quantity of 10 in this BOM line item), a cell 446 that provides the estimated issue date or EID for the quantity that is currently in process, and a cell 448 that provides the estimated time to arrival or ETA of the quantity that is currently in process, among one or more other cells. In one arrangement, the row 433 may be expanded to provide historical information regarding when matches were found in infrastructure assets by the concentric searching module 406, when such assets were sent for shipment to the originating location, and the like. While not shown, any "available/pull quantity" shown in cell 442 (even if less than the requested line item quantity) may be processed (e.g., via manipulating "process" button 437) which causes the actual issue or delivery of the quantity to the specific location of the project requesting the BOM (which may be the same as or different than the "originating" location as used herein). While also not shown, additional BOM line items may be represented by additional rows within this portion 433.

With continued reference to FIG. 19, the portion 434 may generally provide an indication of a number of matching assets in MA status within the infrastructure (where the matching assets in MA status have been considered by the concentric searching module 406 in the manner discussed in the method 700 of FIG. 17) that are available for request but that have not yet been requested and have not yet entered a process (such as the quantity of 10 in process pending status in the cell 446 in the first portion 433). While not shown, expansion of the portion 434 may cause the presentation of a number of cells, drop-down menus, buttons and/or other features that provide a user with the ability to request a particular quantity of assets in MA status that have previously been matched by the concentric searching module 406.

The portion 436 may generally provide an indication of a number of matching assets within or available to the infrastructure that are not in MA status (i.e., assets that have not specifically been requested by users to be made available for consumption by BOMs originating from locations other than the location where such assets currently reside or are otherwise associated with). For instance, such assets may include those that have been consigned to a dealer but not yet sold. In this case, expansion of the portion 436 may provide the ability for a user to request such assets back from consignment for use in fulfilling a particular line item quantity. As with requests for assets in MA status in portion 434, requests for assets in non-MA status entails the generation of a process within the system that is tagged with a particular process ID (discussed later with respect to FIG. 21) and a corresponding increase in the quantity displayed in the cell 444 in portion 433 to indicate that such assets have been softly allocated to the particular line item quantity. The manner in which non-MA status assets are considered for possible soft allocation to the line item quantity may proceed according to the method 700 of FIG. 15 (i.e., consideration of non-"available" assets at the originating location followed by consideration of non-MA status assets at other locations within the originating location's market followed by consideration of non-MA status assets at locations within other markets of the originating location's region followed by consideration of non-MA status assets at locations within other regions). Any non-matched assets may be indicated in the portion 438 which may indicate the need to order such assets from a secondary market. Of course, a subsequent search by the concentric searching module 406 for line item quantities may change the various matching or unmatched quantities indicated in the portions 432, 434, 436, 438 (e.g., due to the ever-changing inventories of infrastructure locations).

Returning to FIG. 18, each of the BOMs shown in the screenshot 394 includes a particular number in the priority column 416 that broadly indicates an order (relative to the other BOMs) in which infrastructure assets are to be allocated (e.g., softly) to the various line item quantities of the BOMs. That is, in the event that each of two or more BOMs includes at least one line item representing a quantity of the same physical part, matching infrastructure assets having the soonest EID would first be allocated to the highest priority BOM's line item, followed by the line item of the BOM having the next highest priority, and so on. In this regard, the server 104 may include a BOM reprioritization module 408 (see FIG. 1) that broadly serves to allocate matching infrastructure assets according to BOM priority as well as re-allocate matching assets to corresponding BOM line items in the event that the priority number for one or more BOMs is reprioritized or otherwise changed.

Figure 20:
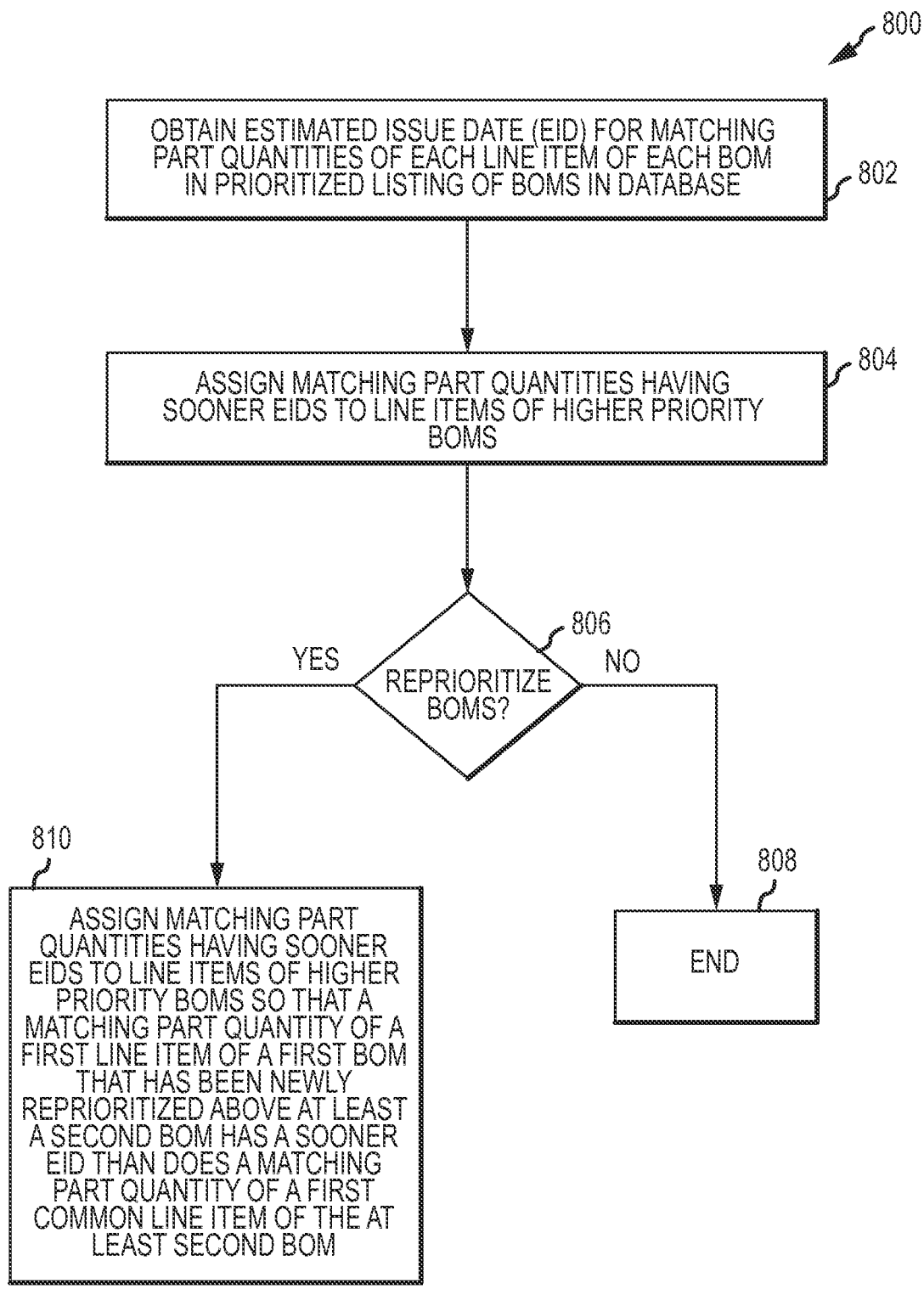
FIG. 20 is a flow diagram of a method for reprioritizing BOMs and reshuffling matching infrastructure assets among BOM line items after a corresponding BOM reprioritization.

With additional reference now to FIG. 20, a method 800 is shown (which may be represented by the BOM reprioritization module 408) that may be executed by the processor 120 for use in automatically assigning or allocating infrastructure assets to BOM line items according to a prioritized listing of BOM as well as reassigning or reallocating infrastructure assets to BOM line items upon a change in the prioritized BOM listing. The method 800 may include obtaining 802 EIDs for matching part quantities of each line item of each BOM in a prioritized listing of BOMs in a database. As discussed above in relation to FIGS. 17-19, BOMs may be uploaded or otherwise requested from various locations within the provider's infrastructure and stored in the BOMs database 340 or other appropriate location and subsequently accessed by the concentric searching module 406 for use in fulfilling the various BOM line items. For instance, the concentric searching module 406 may perform initial searching for matching infrastructure assets for the various BOMs as discussed above in any appropriate manner, such as upon loading of a BOM into the database 340, according to a predetermined schedule, etc.

As discussed previously, matching infrastructure part quantities of BOM line items are assigned EIDs (e.g., see column 426 in FIG. 16 and cell 446 in FIG. 19) which generally convey the soonest that the matching quantity (e.g., corresponding to a matching part, a user-defined alternate part, and/or a kit) can be issued or pulled when considering available inventory (i.e., on-hand inventory at the BOM originating location, e.g., see cell 442 in FIG. 19), inventory that is incoming/ordered or otherwise in process to be delivered to the BOM originating location (e.g., see cell 444 in FIG. 19), and/or internal shipments between warehouses. Returning to FIG. 16, imagine that the BOMs in priority positions one and two (in this example, BOM IDs BOM0001066 and BOM0001062) both include first line items that represent quantities of the same physical part (e.g., as determined by the fuzzy searching module 404). Furthermore, imagine that after the concentric searching module 406 has proceeded to search for matching assets within the provider's infrastructure for the various BOM line items, matching asset quantities have been identified where a first quantity of matching assets has a first EID and a second quantity of matching assets has a second EID that is later in time than the first EID. It should be appreciated that identification of the first quantity of matching assets having the sooner EID need not necessarily be a result of the first BOM to be processed by the concentric searching module 406. For instance, it is envisioned that the first BOM may be processed by the concentric searching module 406 resulting in matching assets having a first EID, and at some later time, the second BOM may be processed by the concentric searching module 406 resulting in the same matching assets but having a second EID that is sooner or earlier in time that the first EID.

In any event, the method 800 may include assigning 804 matching part quantities having sooner EIDs to higher priority BOMs in the prioritized listing of BOMs. In the above example, the first quantity of matching assets would be used to fulfill the first line item quantity of the first priority BOM; any remaining portion of the first quantity of matching assets would be used to fulfill the first line item quantity of the second priority BOM followed by, if necessary, at least a portion of the second quantity of matching assets (or additional quantities of matching assets). Of course, if other lower priority BOMs in the listing also include line items representing the same physical part, any matching assets would be appropriately allocated to such line items in a manner so that line items of higher priority BOMs are fulfilled with matching assets having sooner EID than are line items of lower priority BOMs. Furthermore, similar allocation of matching infrastructure assets applies to BOMs having more than one line item.

The method 800 may also proceed to query 806 whether one or more BOMs in the listing are to be reprioritized and end 808 if no BOMs are to be reprioritized. For instance, in the event that it has become increasingly important to complete an infrastructure project associated with a lower priority BOM in a reduced period of time, a user may choose to move its corresponding BOM to a higher priority position in the listing. Again with reference to FIG. 18, a user could move the BOM currently in priority position ten to priority position five such as by modifying the corresponding cell in the priority column 416 to read "5," clicking or tapping some portion of the row representing the BOM and dragging the BOM up to priority position five, and/or in one or more other appropriate manners. In one arrangement, a user may be required to click or otherwise manipulate a "process" or "reprioritize BOMs"-type button (not shown) after one or more BOMs have been moved to one or more desired positions in the priority listing.

In the event of a positive answer to the inquiry at 806, the method 800 may proceed to assign 810, responsive to the BOM reprioritization, matching infrastructure part quantities having sooner EIDs to line items of higher priority BOMs so that a matching infrastructure part quantity of a first line item of a first BOM that has been newly reprioritized above at least a second BOM has a sooner EID that does a matching infrastructure part quantity of a common first line item of the at least second BOM. Stated differently, the method 800 may essentially proceed to group or otherwise collectively consider all of infrastructure assets that had been softly allocated to BOM line item quantities and then "reshuffle" the assets so that the line items of BOMs moved higher in priority may now be fulfilled with matching assets having EIDs that are sooner the matching asset EIDs that existed before the reprioritization and reshuffling (where the reprioritization could include the prioritization of one BOM or many BOMs).

For instance, in the event that a BOM is moved up to a different priority position, each of the BOMs below the newly moved BOM has now been moved down a priority position. Furthermore, various combinations of reprioritizing BOMs both upwardly and downwardly are envisioned. In any case, the disclosed process of reprioritizing BOMs and reshuffling infrastructure assets among BOM line items based on the reprioritizing may be likened to the "robbing Peter to pay Paul" analogy as infrastructure assets that were previously assigned to line items of a first BOM (and maybe even specifically ordered for the first BOM) may now be assigned to line items of a different, second BOM. Thus, as opposed to the manual, time-intensive and error prone process currently used by most companies to reprioritize BOM line item, the disclosed processes automate the BOM reprioritization process and allow for efficient and accurate reshuffling of infrastructure assets among BOM line item quantities based on the reprioritization and corresponding inventory allocation and management. In one arrangement, users may be able to "lock" or "bind" matching infrastructure quantities to particular BOM line items to prevent such locked quantities from being allocated to line items of other BOMs during the reshuffling process. In other words, such locked or bound infrastructure quantities may be "hard" allocated to the BOM line items. In this regard, users may essentially be able to prioritize infrastructure asset allocation at a line item level (i.e., in addition to at a BOM level as discussed above).

As discussed throughout this disclosure, various part quantities of the provider's infrastructure may be placed into a number of different processes (e.g., internal movement of a part quantity in MA status between infrastructure locations to fulfill a BOM line item, movement of a part quantity between an infrastructure location and a third party such as a dealer, etc.). In another aspect of the present disclosure, placement of a part quantity into at least some of the processes may cause a corresponding initiation of an "ADT" (asset disposition tracking) process or posting that broadly serves to track shipped and received assets between locations (e.g., infrastructure location to infrastructure location, infrastructure location to third party and/or third party to third part) by way of comparing shipped and received lists, highlighting discrepancies, and updating asset data in the customer asset database 339 (e.g., changing the status of a particular asset from "in transit" to "received" and adjusting the asset count held by each location).

Figure 21:
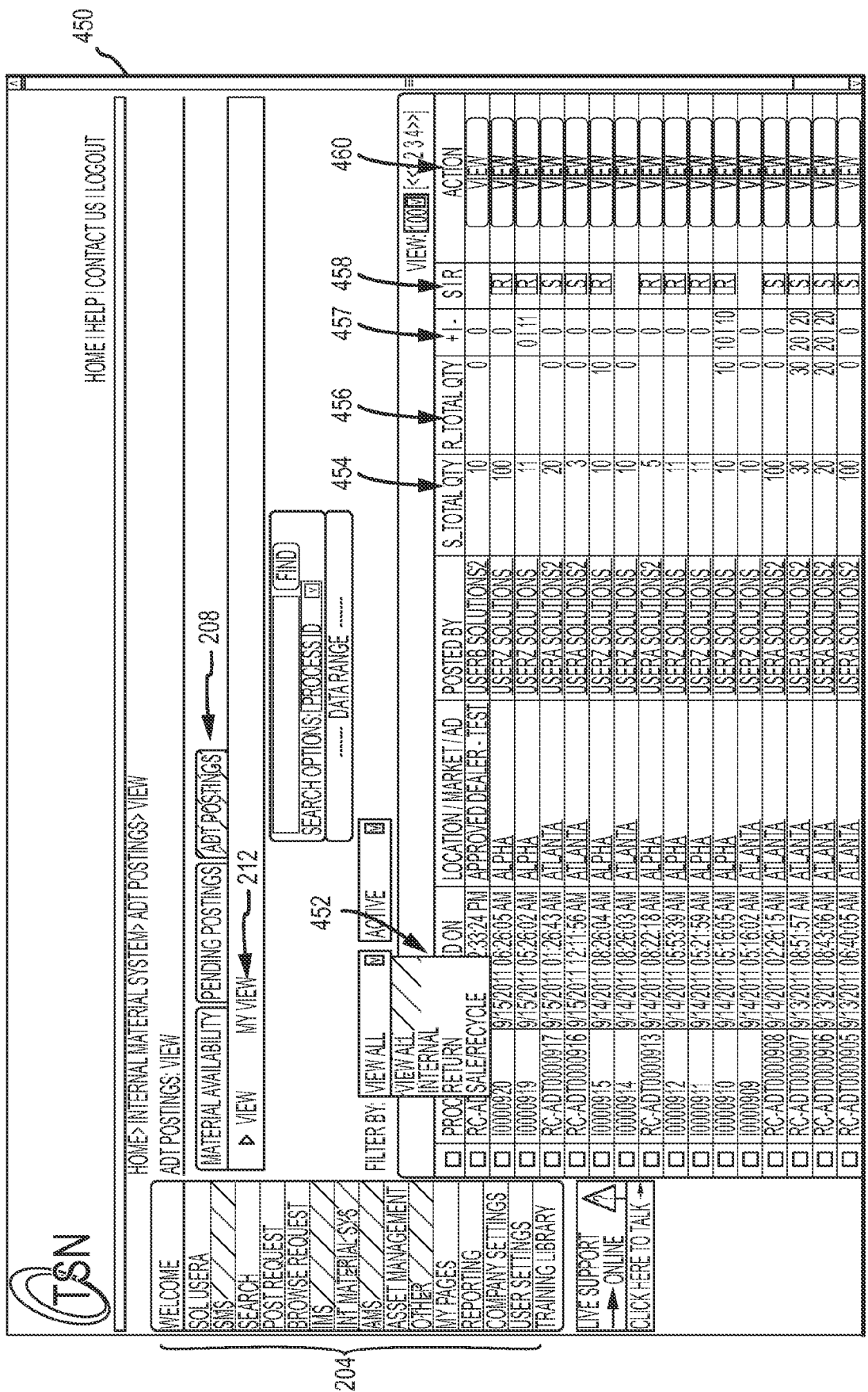

Turning now to FIG. 21, another screenshot 450 of the portal 136 is illustrated that broadly presents a list of processes (identified by corresponding process IDs) that have been posted for ADT processing. For instance, the screenshot 450 may include a "process ID" column 452 (that identifies the corresponding process that caused initiation of ADT processing, such as a BOM process, a "send to recycle" process, etc.), a "total shipped quantity" column 454, a "total received quantity" column 456, a "+/−" column 457 (e.g., showing discrepancies between shipped and received assets), a "shipper/receiver" column 458, an "action" column 460 (e.g., that allows a user to take at least one action with respect to the part quantity), and/or one or more other columns (e.g., location, market, poster, etc.).

Figure 22:
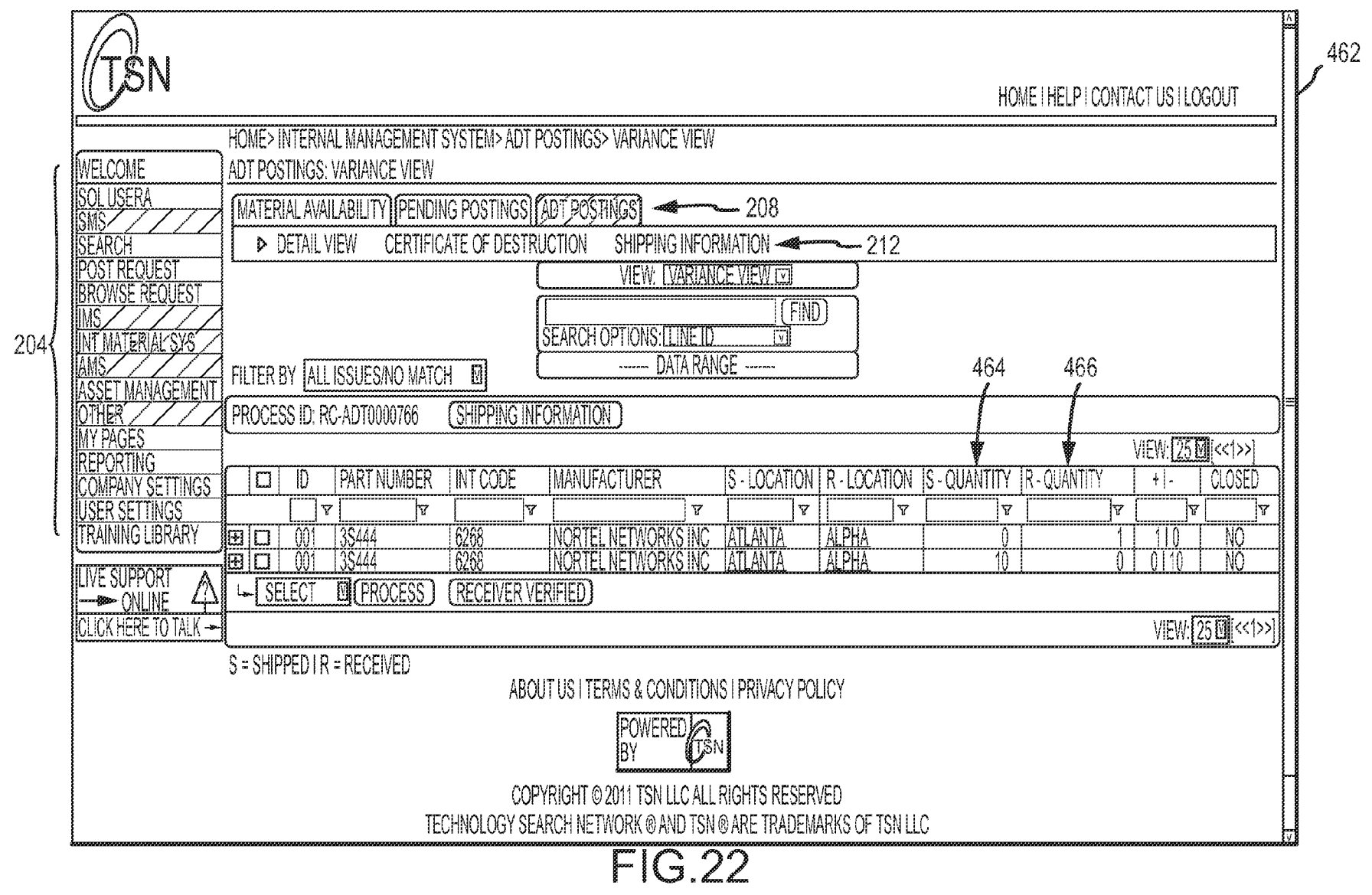
Figure 23:
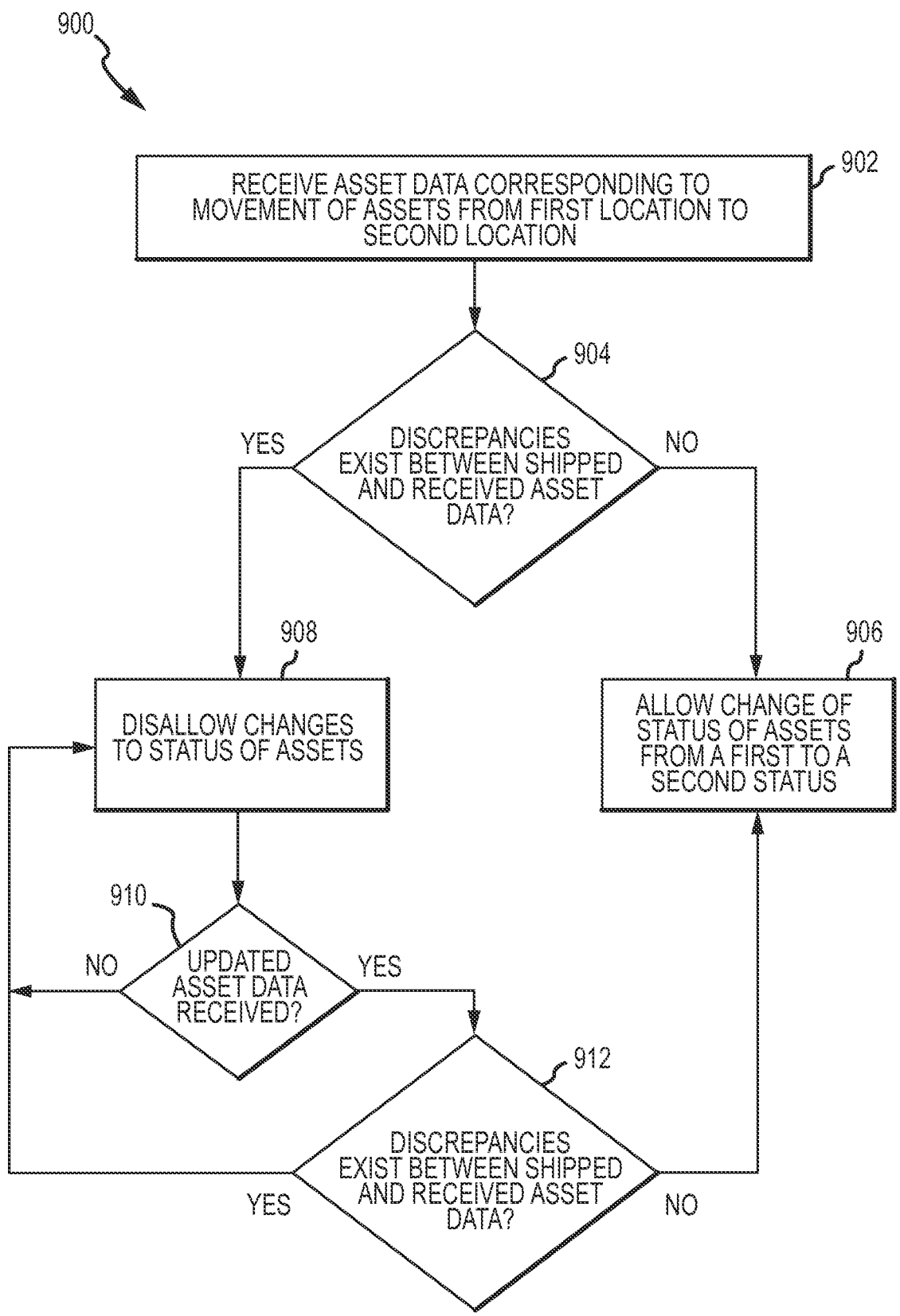
FIG. 23 is a flow diagram of a method for monitoring asset shipments between locations of a service provider and/or third parties.

In relation to ADT, the server 104 may include an ADT module 412 (see FIG. 1) that broadly serves to monitor shipments and take corresponding actions depending upon a status of the shipments. Turning now to FIG. 23, a method 900 is shown (which may be represented by the ADT module 412) that may be executed by the processor 120 for use in monitoring shipments between internal infrastructure locations and/or third party locations. The method 900 may include receiving 902 asset data corresponding to movement of assets from a first location (infrastructure third party) to a second location (infrastructure or third party). For instance, and turning to the screenshot 462 of FIG. 22 (which may result upon manipulation of a "view" button in the "action" column 460 corresponding to a particular process in FIG. 21), the asset data may include shipped asset data corresponding to assets reported to have been shipped from a first physical location to a second physical location (see column 464 in FIG. 22), received asset data corresponding to assets reported to have been received at the second physical location from the first physical location (see column 466 in FIG. 22), and status data including a first status of the assets within the infrastructure (not shown, but a status such as "in transit," "in process," or the like). In one arrangement, the receiving location may be required to upload received asset data in any appropriate format (e.g., as part of a spreadsheet) to the server 104 over network(s) 112 which may be appropriately parsed, stored in storage 124, and accessed by portal 136 to populate one or more cells in the column 466.

In any case, the method 900 may eventually proceed to query 904 whether discrepancies exist between the shipped and received asset data (e.g., quantities, part numbers, etc.). For instance, note how the column 464 indicates a shipped quantity of 10 and the column 466 indicates a received quantity of 1 for a particular part identified by a part number of "3S444," an internal code of "6268," and a manufacturer name of "Nortel Networks Inc." As a result, it may be preliminarily determined that a discrepancy exists between the shipped and received asset data and the method 900 may proceed to disallow 908 changes to the status of the corresponding assets (i.e., from an "in transit" status to a "received" status). The method 900 may then proceed to query 910 whether updated asset data has been received (e.g., from an RMP) and continue to cycle back to 908 if updated asset data has not been received. When and if updated asset data is received, the method 900 may again query 912 whether discrepancies exist between the shipped and received asset data as modified by the updated data. If discrepancies continue to exist, the method 900 may flow back to 908. If no discrepancies are determined to exist between the shipped and received asset data (e.g., both correspond to a quantity of 10 of the same part) at either 904 or 912, the method 900 may flow to 906 and proceed to allow status changes of the assets from a first status (e.g., "in transit") to a second status (e.g., "received").

It should be appreciated how disallowing changes to the status of such assets essetnailly forces action on the part of an RMP or other user to rectify the discrepancy because a failure to do so would prevent the assets from being able to fulfill BOM line items, be sold by dealers, etc. In other words, a failure to act by the RMP or other user would cause a chokepoint in the free and efficient flow of infrastructure assets. For instance, in the case of an internal shipment of a particular asset quantity from a first infrastructure location to a second infrastructure location to fulfill a line item of a BOM originating at the second location, a user would not be able to issue the BOM (or other BOM in the case of a BOM reprioritization) until the particular asset quantity has been accorded a status of "received," "ready to issue," and/or the like. In this regard, preventing a change to a status of "received" or "ready to issue" until shipped/received quantity discrepancies have been resolved advantageously forces RMPs or other users to correct such discrepancies which thereby increases the accuracy of infrastructure records and related data. For instance, and while not shown, an RMP or other user may be directed from the screenshot 462 of FIG. 22 to another screenshot (not shown, e.g., upon manipulation of any appropriate button or other feature) whereby the RMP may be able to manually modify or updated shipped and/or received asset data (e.g., quantities, part identifying data, etc.) for storage in the customer asset database 339. Part of this process may require the RMP to communicate with managers resident at the physical locations between which the assets were/are being shipped to confirm the actual shipment/receipt of the assets (and/or lack thereof). The updated shipped and/or received asset data may then be reanalyzed to determine whether discrepancies still exist (e.g., at step 912 of FIG. 23) whereby the user may be required to again modify the data or else the asset status may be appropriately changed.

The present functionalities may also include one or more "reporting" functionalities that take kitting into consideration. In one arrangement, and rather than simply knowing there are "x" number of kits in stock, the reporting functionalities can provide reports on all assets regardless of "kit" associations and listings within the system. For instance, while a kit might be listed as "xyz," the reporting functionality may provide the ability to include as a kit or not as a kit in a reporting dump of assets per location or provider-wide. In this regard, it may be clear as to how many items of "x that the provider really has, be it in a kit or listed as a piece part within their inventory listing providing the ability to combine piece parts that are within a designated kit and in piece parts to get a more accurate count on actual assets on hand.

While this disclosure contains many specifics, these should not be construed as limitations on the scope of the disclosure or of what may be claimed, but rather as descriptions of features specific to particular embodiments of the disclosure. Furthermore, numerous other arrangements are envisioned. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

One or more computer programs (also known as a program, software, software application, script, or code) used to provide the functionality described herein (such as to perform concentric parts searching, BOM reprioritization and line item reshuffling, and the like) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

In different embodiments, system 100 (i.e., the server 104, one or more providers 108, etc.) may include one or more of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

What is claimed is:

1. A method for managing inventory within the infrastructure of a technology service provider, the method comprising:
   providing a database comprising a prioritized listing of bills of material (BOMs), wherein each BOM includes a plurality of line items, and wherein each line item represents a quantity of a part requested for at least one project within the infrastructure;
   determining, by a processor, an estimated issue date (EID) for asset quantities of the infrastructure that are assigned to each line item of each BOM, wherein each EID represents the soonest that the assigned infrastructure asset quantities can fulfill the quantity of parts of the line item, wherein the prioritized listing of BOMs comprises first and second BOMs, wherein the first and second BOMs comprise first line items representing a first common part, wherein an infrastructure asset quantity assigned to the first line item of the first BOM has a sooner EID than does an infrastructure asset quantity assigned to the first line item of the second BOM;
   positioning the second BOM in a new position above the first BOM in the prioritized listing of BOMs;
   reassigning, in response to the positioning, infrastructure asset quantities of the common part that were previously assigned to line items of BOMs below the new position to the first line items of the second BOM, wherein after the reassigning, an infrastructure asset quantity allocated to the first line item of the second BOM has a sooner EID than does an infrastructure asset quantity allocated to the first line item of the first BOM.

2. The method of claim 1, wherein the first and second BOMs occupy the first two positions of priority in the prioritized listing of BOMs.

3. The method of claim 1, wherein the first and second BOMs occupy other than the first two positions of priority in the prioritized listing of BOMs.

4. The method of claim 1, wherein the first and second BOMs comprise second line items representing a second common part; wherein before the positioning, an infrastructure asset quantity allocated to the second line item of the first BOM has a sooner EID than does an infrastructure asset quantity allocated to the second line item of the second BOM; and wherein after the assigning, an infrastructure asset quantity allocated to the second line item of the second BOM has a sooner EID than does an infrastructure asset quantity allocated to the second line item of the first BOM.

5. The method of claim 1, further comprising:

binding an infrastructure asset quantity of a line item of a BOM of the prioritized listing of BOMs to the BOM to create a bound asset quantity, wherein the bound asset quantity is free from assignment to line items of other BOMs during the assigning.

6. The method of claim 1, wherein BOMs are prioritized in the prioritized listing of BOMs according to date of entry into the prioritized listing of BOMs.

7. The method of claim 1, wherein a position within the prioritized listing of BOMs occupied by the second BOM before the positioning comprises a former position, and wherein the reassigning further comprises reassigning, in response to the positioning, infrastructure asset quantities of the common part that were previously assigned to line items of BOMs above the former position to the first line items of the second BOM.

8. The method of claim 1, wherein the prioritized listing of BOMs comprises one or more BOMs at one or more respective new positions between the former and new positions of the second BOM, and wherein the method further comprises:

reassigning, in response to the positioning, infrastructure asset quantities among the BOMs at the one or more respective new positions based on the new positions.

9. The method of claim 1, wherein the infrastructure asset quantities comprise at least one of available inventory, inventory that is in process to be delivered to a BOM originating location, and internal shipments between warehouses of the infrastructure.

* * * * *

UNITED STATES PATENT AND TRADEMARK OFFICE
CERTIFICATE OF CORRECTION

PATENT NO. : 8,650,101 B1
APPLICATION NO. : 13/252086
DATED : February 11, 2014
INVENTOR(S) : Robert Glustrom and Richard Schafer It is certified that error appears in the above-identified patent and that said Letters Patent is hereby corrected as shown below:

In the Claims:

Column 27, line 7, Claim 4, delete "assigning" and insert therefore --reassigning--.

Column 28, line 7, Claim 8, delete "The method of claim 1" and insert therefore --The method of Claim 7--.

Signed and Sealed this
Thirteenth Day of May, 2014

Michelle K. Lee
*Deputy Director of the United States Patent and Trademark Office*